United States Patent
Hamada et al.

(10) Patent No.: US 10,336,297 B2
(45) Date of Patent: Jul. 2, 2019

(54) VEHICLE-USE COMMUNICATION SYSTEM, IN-VEHICLE DEVICE, PORTABLE DEVICE, AND NON-TRANSITORY COMPUTER-READABLE RECORDING MEDIUM

(71) Applicants: AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi, Osaka (JP)

(72) Inventors: Yoshihiro Hamada, Osaka (JP); Takumi Asaina, Osaka (JP); Takuya Furuta, Yokkaichi (JP); Hiroyuki Kurata, Yokkaichi (JP)

(73) Assignees: AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/328,687

(22) PCT Filed: Jul. 9, 2015

(86) PCT No.: PCT/JP2015/069721
§ 371 (c)(1),
(2) Date: Jan. 24, 2017

(87) PCT Pub. No.: WO2016/013402
PCT Pub. Date: Jan. 28, 2016

(65) Prior Publication Data
US 2017/0203721 A1    Jul. 20, 2017

(30) Foreign Application Priority Data
Jul. 25, 2014    (JP) .................................. 2014-152098

(51) Int. Cl.
*B60R 25/24* (2013.01)
*G07C 9/00* (2006.01)
(Continued)

(52) U.S. Cl.
CPC ............ *B60R 25/245* (2013.01); *B60R 25/01* (2013.01); *B60R 25/241* (2013.01); *G01S 1/08* (2013.01);
(Continued)

(58) Field of Classification Search
CPC .......... B60Q 1/00; B60Q 1/52; B60R 16/037; B60R 16/0373; B60R 25/00; B60R 25/10;
(Continued)

(56) References Cited

U.S. PATENT DOCUMENTS

2005/0046568 A1   3/2005  Tanaka
2006/0224290 A1   10/2006 Nakashima et al.
(Continued)

FOREIGN PATENT DOCUMENTS

DE    102010054593 A1    12/2011
JP    2010060457 A       3/2010
(Continued)

OTHER PUBLICATIONS

International Search Report and English translation for PCT/JP2015/069721, dated Sep. 1, 2015, 2 pp.

*Primary Examiner* — Dionne Pendleton
(74) *Attorney, Agent, or Firm* — Honigman LLP

(57) ABSTRACT

A vehicle-use communication system includes an in-vehicle device and a portable device. The in-vehicle device transmits a signal from a plurality of transmitting antennas provided in a vehicle. The portable device measures the received signal strength of the signal transmitted from each of the plurality of transmitting antennas and transmits a response signal containing the received signal strength of (Continued)

each signal. The in-vehicle device receives the response signal and stores: small space information concerning a small space of a vehicle cabin; and large space information concerning being the entirety of the vehicle cabin. The in-vehicle device selects the small space information or the large space information in accordance with the situation, and determines whether the portable device is within the vehicle cabin on the basis of the selection of small space information or the large space information and the received signal strengths contained in the response signals.

8 Claims, 24 Drawing Sheets

(51) Int. Cl.
*G05B 19/00* (2006.01)
*G01S 1/08* (2006.01)
*H04B 17/27* (2015.01)
*H04B 17/318* (2015.01)
*B60R 25/01* (2013.01)
*G01S 5/02* (2010.01)

(52) U.S. Cl.
CPC ........ *G01S 5/0252* (2013.01); *G07C 9/00111* (2013.01); *H04B 17/27* (2015.01); *H04B 17/318* (2015.01); *G07C 2209/63* (2013.01); *G07C 2209/64* (2013.01)

(58) Field of Classification Search
CPC ... B60R 25/1004; B60R 25/245; B60R 25/01; B60R 25/241; B60W 40/09; B60W 50/08; G01C 17/38; G01C 21/00; G01C 21/26; G01C 21/34; G01C 21/36; G01C 21/3647; G01C 22/006; G07C 2009/00769; G07C 2209/63; G07C 5/00; G07C 5/008; G07C 5/0808; G07C 5/085; G07C 9/00126; G07C 9/00158; G07C 9/00309; G08B 13/19647; G08B 21/02; G08B 21/0205; G08B 21/06; G08B 25/016; G08B 29/188; H04N 21/214; H04N 21/2181; H04N 21/25841; H04N 21/41422; H04N 21/4542; H04N 21/4751; H04N 7/181; H04W 12/06; H04W 12/08; H04W 36/0005; H04W 36/32; H04W 36/34; H04W 48/02; H04W 48/04; H04W 4/046; H04W 4/12; H04W 4/21; H04W 4/60; H04W 64/006; H04W 76/11; H04W 84/005; G01S 11/06; G01S 13/825; G05D 1/0027; G05D 1/0212; G05D 23/1917; G06F 17/28; G06F 17/30247; G06F 17/30557; G06F 17/30864; G06F 21/00; G06F 21/31; G06F 21/32; G06F 3/016; G06F 3/017; G06F 3/0481; G06F 3/04842; G06F 3/0488; G06F 8/65; G06K 2009/00939; G06K 9/00255; G06K 9/00268; G06K 9/00355; G06K 9/00832; G06Q 10/00; G06Q 10/02; G06Q 10/1093; G06Q 10/20; G06Q 20/145; G06Q 30/00; G06Q 30/012; G06Q 30/0265; G06Q 30/0633; G06Q 30/0639; G06Q 30/0645; G06Q 50/30; G08G 1/0965; G08G 1/096725; G08G 1/096741; G08G 1/096775; G08G 1/166; H01Q 1/3233; H01Q 1/325; H04B 5/0056; H04B 7/0608; H04B 17/27; H04B 17/318; H04L 63/08; H04L 67/10; H04L 67/12; H04L 67/306; H05K 999/00
See application file for complete search history.

(56) References Cited

U.S. PATENT DOCUMENTS

| 2006/0267407 | A1  | 11/2006 | Nagaoka et al. | |
|---|---|---|---|---|
| 2007/0188301 | A1* | 8/2007  | Nakajima | B60R 25/24 340/5.61 |
| 2010/0305779 | A1* | 12/2010 | Hassan | G01C 17/38 701/2 |
| 2014/0309813 | A1* | 10/2014 | Ricci | B60Q 1/00 701/2 |
| 2016/0371906 | A1* | 12/2016 | Fujiyama | B60R 25/245 |
| 2017/0158169 | A1* | 6/2017  | Luo | B60R 25/245 |

FOREIGN PATENT DOCUMENTS

| JP | 4483236 B2    | 6/2010 |
| JP | 4529762 B2    | 8/2010 |
| JP | 4673230 B2    | 4/2011 |
| JP | 4673234 B2    | 4/2011 |
| JP | 2012-122222 A | 6/2012 |
| JP | 5437959 B2    | 3/2014 |

* cited by examiner

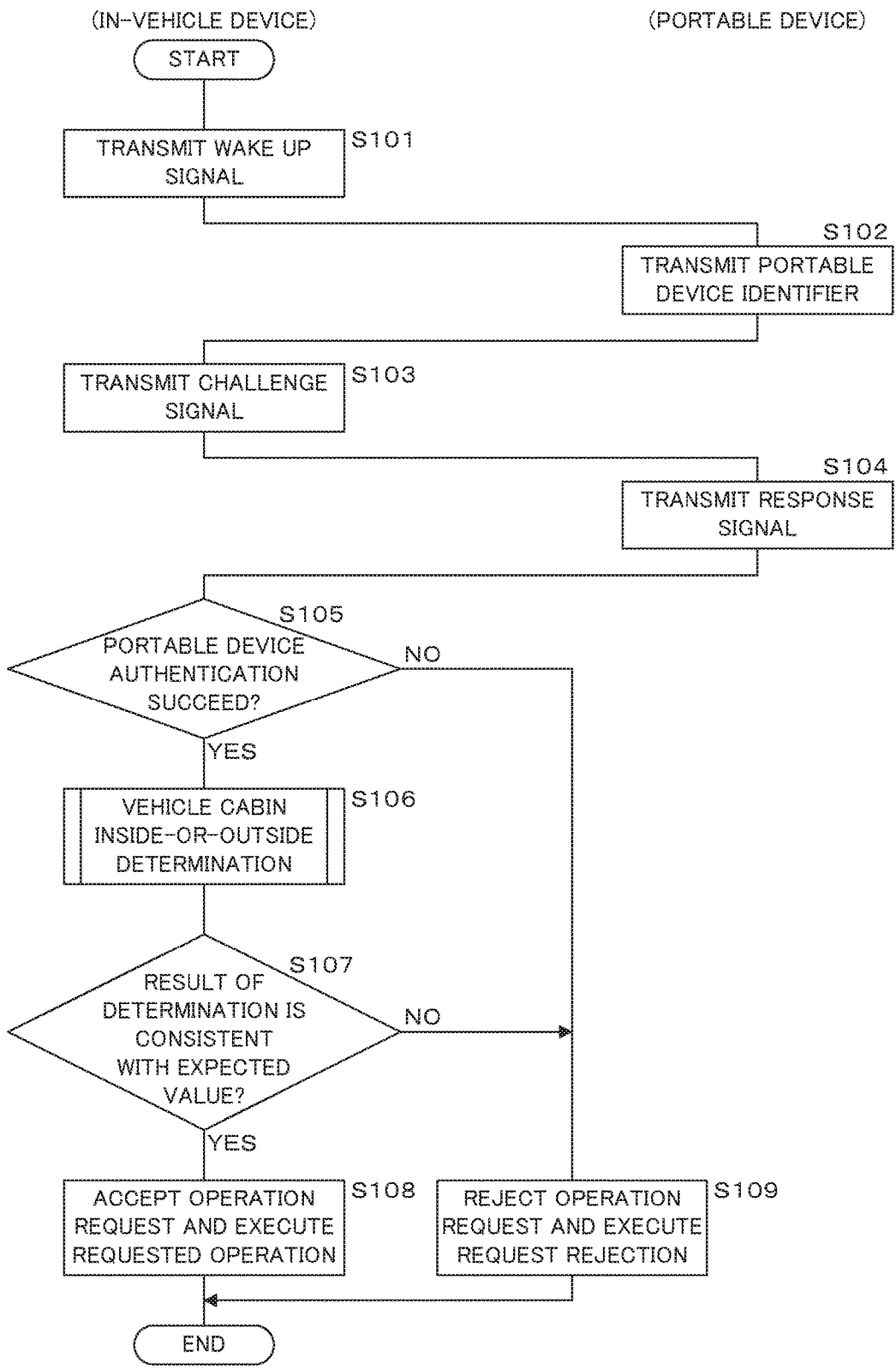

VEHICLE-USE COMMUNICATION SYSTEM, IN-VEHICLE DEVICE, PORTABLE DEVICE, AND NON-TRANSITORY COMPUTER-READABLE RECORDING MEDIUM

CROSS-REFERENCE TO RELATED APPLICATIONS

This application is the national phase under 35 U. S. C. § 371 of PCT International Application No. PCT/JP2015/069721 which has an International filing date of Jul. 9, 2015 and designated the United States of America.

FIELD

The present disclosure relates to: a vehicle-use communication system; an in-vehicle device and a portable device constituting the vehicle-use communication system; and a computer program.

BACKGROUND

A vehicle-use communication system is in practical use in which locking or unlocking of a vehicle door is achieved without the use of a mechanical key. Specifically, such systems in practical use include: a keyless entry system in which locking or unlocking of a vehicle door is achieved by wireless remote operation by using a portable device carried by a user; and a smart entry (registered trademark) system in which a vehicle door is unlocked when a user carrying a portable device merely approaches the vehicle or merely grips the door handle.

Further, a vehicle-use communication system is also in practical use in which engine start in a vehicle is achieved without the use of a mechanical key. Specifically, a smart start system is in practical use in which the engine is started when a user carrying a portable device merely pushes an engine start button.

In the communication systems described above, the in-vehicle device performs communication with the portable device by using radio signals so as to perform authentication and, after that, perform control concerning the given operation of unlocking, locking, engine start, or the like. However, for the purpose of preventing unauthorized operation, before the operation is executed, it is checked that the portable device is located at a given position. As methods of checking the position of the portable device, methods described in Japanese Patent Publication No. 4483236, Japanese Patent Publication No. 4673234 and Japanese Patent Publication No. 4673230 or the like are known.

Japanese Patent Publication No. 4483236 discloses a position detection method in which a signal is transmitted from an inside-the-vehicle-cabin antenna and an outside-the-vehicle-cabin antenna to the inside and the outside of the vehicle cabin and then the position of the portable device is determined on the basis of which signal triggers a response from the portable device.

Japanese Patent Publication No. 4673234 discloses a keyless entry apparatus in which a portable device receives signals transmitted from a plurality of antennas provided in a vehicle and then the position of the portable device is determined on the basis of the received signal strengths of the signals received by the portable device. The in-vehicle device according to Japanese Patent Publication No. 4673234 stores, in advance, data required for determination of the position of the portable device. Specifically, the portable device is arranged at a plurality of locations along the inner side of the vehicle cabin inside-outside boundary and then the portable device receives signals for received signal strength measurement (for portable device position determination) transmitted from the plurality of transmitting antennas connected to the in-vehicle device so as to measures the received signal strengths of the signals. Similarly, the portable device is arranged at a plurality of locations along the outer side of the vehicle cabin inside-outside boundary and then the portable device receives signals for received signal strength measurement transmitted from the plurality of transmitting antennas connected to the in-vehicle device so as to measures the received signal strengths of the signals. Then, the in-vehicle device stores in advance: the vehicle-cabin inside data group containing a plurality of received signal strengths measured in a state that the portable device follows the inner side of the vehicle cabin inside-outside boundary; and the vehicle-cabin outside data group containing a plurality of received signal strengths measured in a state that the portable device follows the outer side of the vehicle cabin inside-outside boundary.

At the time of operation of the keyless entry system, the portable device measures the received signal strengths of the signals transmitted from the plurality of transmitting antennas and then transmits the measured received signal strengths to the in-vehicle device. The in-vehicle device receives the received signal strengths transmitted from the portable device and then, on the basis of the Mahalanobis distance, determines whether the received signal strengths measured by the portable device are closer to the vehicle-cabin inside data group or the vehicle-cabin outside data group. If the received signal strengths are closer to the vehicle-cabin inside data group, the in-vehicle device determines that the portable device is within the vehicle cabin. Further, if the received signal strengths are closer to the vehicle-cabin outside data group, it is determined that the portable device is located in the outside of the vehicle cabin.

Japanese Patent Publication No. 4673230 discloses a keyless entry apparatus having a similar configuration to Japanese Patent Publication No. 4673234. In the keyless entry apparatus according to Japanese Patent Publication No. 4673230, movement of a door mirror provided in the vehicle affects the signal transmitted from the transmitting antenna so that the received signal strength measured by the portable device varies. Thus, the keyless entry apparatus stores individual first data groups each obtained by measurement in a state that the portable device is arranged along the inner side of the vehicle in a situation that the door mirror is opened or closed.

Similarly, the keyless entry apparatus stores individual second data groups each obtained by measurement in a state that the portable device is arranged along the outer side of the vehicle in a situation that the door mirror is opened or closed. The keyless entry apparatus detects the open-or-closed state of the door mirror. Then, when the door mirror is opened, whether the portable device is within the vehicle cabin is determined by using the first data group and the second data group obtained in a situation that the door mirror is opened. When the door mirror is closed, whether the portable device is within the vehicle cabin is determined by using the first data group and the second data group obtained in a situation that the door mirror is closed.

However, in order that the position determination of the portable device may be accurately performed by using the method of Japanese Patent Publication No. 4483236, the physical strengths of the signals transmitted from the inside-the-vehicle-cabin antenna and the outside-the-vehicle-cabin antenna are required to be adjusted such that the outside and the inside are clearly distinguished on the vehicle cabin inside-outside boundary of the vehicle. This causes a problem of physical difficulty in the adjustment.

In order that a situation may be avoided that the keyless entry apparatus performs erroneous detection of the position of the portable device and hence locking or unlocking of the door is erroneously performed, leakage of a signal from the inside-the-vehicle-cabin antenna to the outside of the vehicle cabin is required to be suppressed as much as possible. However, there is a tendency that the signal from the inside-the-vehicle-cabin antenna leaks through the glass portion of the vehicle door to the outside of the vehicle cabin, and adjustment of this is difficult.

Further, in Japanese Patent Publication No. 4673234, the position determination of the portable device is performed by using the vehicle-cabin inside data group and the vehicle-cabin outside data group of the received signal strengths measured by a method that the portable device is arranged along the inner side and the outer side of the vehicle cabin inside-outside boundary. However, a problem that the signal from the transmitting antenna partly leaks through the glass portion of the vehicle door to the outside of the vehicle cabin is not allowed to be resolved. Thus, erroneous position determination of the portable device may occur.

Further, in Japanese Patent Publication No. 4673230, even when the position of the door mirror, the seat, the steering wheel, or the like varies, the position of the portable device is allowed to be accurately determined. Yet, the problem that the signal from the transmitting antenna partly leaks through the glass portion of the vehicle door to the outside of the vehicle cabin is not allowed to be resolved. Thus, erroneous position determination of the portable device may occur.

Further, also in each of Patent Japanese Patent Publication No. 4483236, Japanese Patent Publication No. 4673234 and Japanese Patent Publication No. 4673230, in a case that the condition for determining that the portable device is within the vehicle cabin is set strict, for example, a trouble is caused that despite that the portable device is actually within the vehicle cabin, the portable device is erroneously determined as being located in the outside of the vehicle cabin so that the engine is not started. In contrast, in a case that the condition for determining that the portable device is within the vehicle cabin is set loose, for example, a trouble is caused that despite that the portable device is actually located in the outside of the vehicle cabin, the portable device is erroneously determined as being within the vehicle cabin so that the locking of the door is released from the outside of the vehicle.

An object of the present patent application is to provide: a vehicle-use communication system in which in the position determination of a portable device performed such that the portable device receives signals transmitted from a plurality of antennas provided on a vehicle side and then the position determination is achieved on the basis of the received signal strengths of the signals measured by the portable device, even when an influence is caused by a signal partly leaking from the inside of the vehicle cabin through a portion of the vehicle to the outside of the vehicle cabin, a situation is allowed to be avoided that the portable device actually located in the outside of the vehicle cabin is erroneously detected as being within the vehicle cabin, and further the portable device within the vehicle cabin is allowed to be reliably detected; an in-vehicle device and a portable device constituting the vehicle-use communication system; and a computer program.

SUMMARY

The vehicle-use communication system according to an aspect of the present disclosure is a vehicle-use communication system comprising: an in-vehicle device transmitting a signal from a plurality of antennas provided in a vehicle; and a portable device receiving the signal transmitted from the in-vehicle device and transmitting a response signal in accordance with the received signal, wherein the portable device includes: a measurement part measuring the received signal strength of the signal transmitted from each of the plurality of antennas; and a transmitting part transmitting a response signal containing the received signal strength of each signal measured by the measurement part, and wherein the in-vehicle device includes: an in-vehicle receiving part receiving the response signal transmitted from the portable device; a storage part storing small space information concerning a small space contained in a vehicle cabin and large space information concerning a large space larger than the small space and containing the vehicle cabin; a selection part selecting the small space information or the large space information stored in the storage part; and a vehicle cabin inside-or-outside determination part, on the basis of the received signal strengths contained in the response signals received by the in-vehicle receiving part and on the basis of the small space information or the large space information selected by the selection part, determining whether the portable device is within the vehicle cabin.

The in-vehicle device according to an aspect of the present disclosure is an in-vehicle device transmitting a signal from a plurality of antennas provided in a vehicle and receiving a response signal transmitted from a portable device in accordance with the signal, comprising: an in-vehicle receiving part receiving the response signals containing received signal strengths of the signals individually transmitted from the plurality of antennas measured at the portable device; a storage part storing small space information concerning a small space contained in a vehicle cabin and large space information concerning a large space larger than the small space and containing the vehicle cabin; a selection part selecting the small space information or the large space information stored in the storage part; and a vehicle cabin inside-or-outside determination part, on the basis of the received signal strengths contained in the response signals received by the in-vehicle receiving part and on the basis of the small space information or the large space information selected by the selection part, determining whether the portable device is within the vehicle cabin.

The portable device according to an aspect of the present disclosure is a portable device receiving a plurality of signals transmitted from a vehicle and transmitting response signals in accordance with the received signals, comprising: a measurement part measuring received signal strengths of the plurality of signals; a storage part storing small space information concerning a small space contained in a vehicle cabin and large space information concerning a large space larger than the small space and containing the vehicle cabin; a selection part selecting the small space information or the large space information stored in the storage part; and a vehicle cabin inside-or-outside determination part, on the basis of the received signal strengths measured by the measurement part and on the basis of the small space information or the large space information selected by the selection part, determining whether itself is within the vehicle cabin.

The computer program according to an aspect of the present disclosure is a computer program causing a computer to, on the basis of the received signal strengths of signals transmitted from a plurality of antennas provided in a vehicle and received by a portable device, determine whether the portable device is within the vehicle cabin, wherein the computer is caused to serve as: a selection part selecting small space information concerning a small space contained in a vehicle cabin or large space information concerning a large space larger than the small space and containing the vehicle cabin; and a vehicle cabin inside-or-outside determination part, on the basis of the received signal strengths and on the basis of the small space information or the large space information selected by the selection part, determining whether the portable device is within the vehicle cabin.

Here, in addition to a configuration that the present patent application is implemented as a vehicle-use communication system, an in-vehicle device, and a portable device employing such a characteristic processing part, the present patent application may be implemented as a vehicle communication method employing steps of such characteristic processing or, alternatively, as a program causing a computer to execute these steps. Further, the present patent application may be implemented as an integrated circuit used for realizing a part or all of the vehicle-use communication system, the in-vehicle device, and the portable device or, alternatively, as any other system including the vehicle-use communication system, the in-vehicle device, and the portable device.

The configurations described above are allowed to provide: a vehicle-use communication system in which in the position determination of a portable device performed such that the portable device receives signals transmitted from a plurality of antennas provided on a vehicle side and the position determination is achieved on the basis of the received signal strengths of the signals measured by the portable device, even when an influence is caused by a signal partly leaking from the inside of the vehicle cabin through a portion of the vehicle to the outside of the vehicle cabin, a situation is allowed to be avoided that the portable device actually located in the outside of the vehicle cabin is erroneously detected as being within the vehicle cabin, and further the portable device within the vehicle cabin is allowed to be reliably detected; an in-vehicle device and a portable device constituting the vehicle-use communication system; and a computer program.

The above and further objects and features will more fully be apparent from the following detailed description with accompanying drawings.

BRIEF DESCRIPTION OF THE DRAWINGS

FIG. 16 is a flow chart illustrating a procedure of processing performed in response to an operation request.

DETAILED DESCRIPTION

Figure 1:
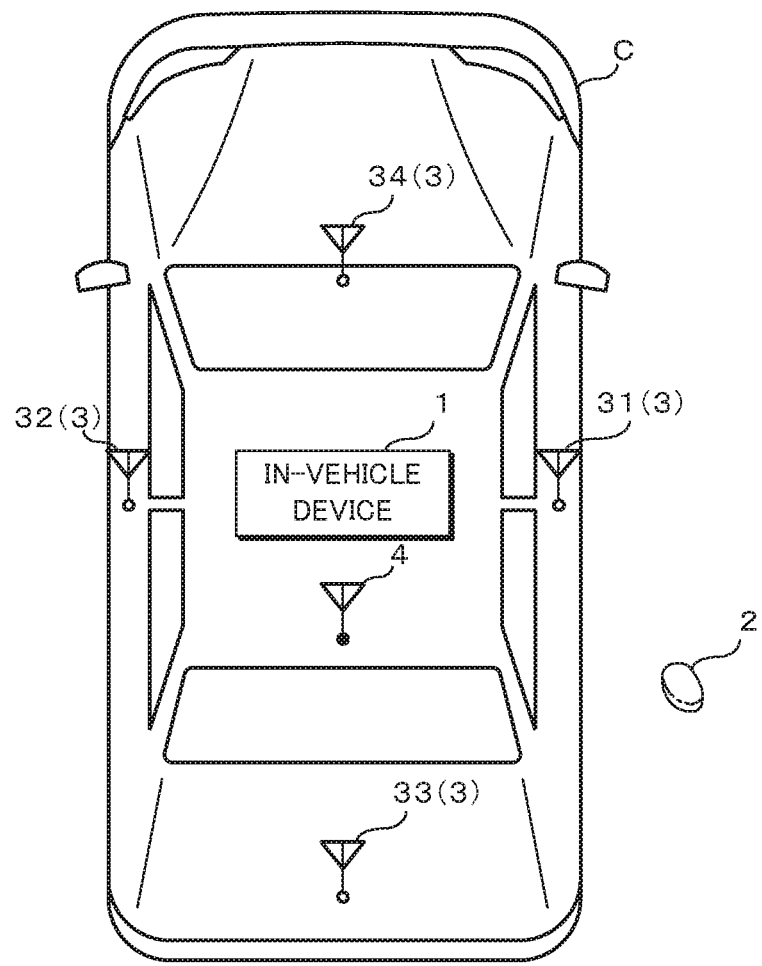
FIG. 1 is a block diagram illustrating an exemplary configuration of a vehicle-use communication system according to Embodiment 1.

First, aspects of the present disclosure are listed and described below. Further, at least a part of the aspects described below may arbitrarily be combined with each other.

(1) The vehicle-use communication system according to an aspect of the present disclosure is a vehicle-use communication system comprising: an in-vehicle device transmitting a signal from a plurality of antennas provided in a vehicle; and a portable device receiving the signal transmitted from the in-vehicle device and transmitting a response signal in accordance with the received signal, wherein the portable device includes: a measurement part measuring the received signal strength of the signal transmitted from each of the plurality of antennas; and a transmitting part transmitting a response signal containing the received signal strength of each signal measured by the measurement part, and wherein the in-vehicle device includes: an in-vehicle receiving part receiving the response signal transmitted from the portable device; a storage part storing small space information concerning a small space contained in a vehicle cabin and large space information concerning a large space larger than the small space and containing the vehicle cabin; a selection part selecting the small space information or the large space information stored in the storage part; and a vehicle cabin inside-or-outside determination part, on the basis of the received signal strengths contained in the response signals received by the in-vehicle receiving part and on the basis of the small space information or the large space information selected by the selection part, determining whether the portable device is within the vehicle cabin.

In the present disclosure, the in-vehicle device transmits a signal from the plurality of antennas provided in the vehicle. The signal is a signal used for determining the position of the portable device. The portable device receives the signal transmitted from each antenna, then measures the received signal strength of each signal, and then transmits to the in-vehicle device a response signal containing the received signal strength obtained by the measurement. The received signal strength of each signal varies depending on the position of the portable device relative to the vehicle. The in-vehicle device receives the response signal transmitted from the portable device.

As information for determining whether the portable device is within the vehicle cabin, the storage part of the in-vehicle device stores: small space information concerning a small space contained in the vehicle cabin; and large space information concerning a large space larger than the small space and containing the vehicle cabin.

The small space is a space contained in the vehicle cabin. Thus, in a case that the determination of whether the portable device is within the vehicle cabin is performed by the determination of whether the portable device is located within the small space, a situation is allowed to be avoided that the portable device actually located in the outside of the vehicle cabin is erroneously determined as being within the vehicle cabin. On the other hand, the large space is a space containing the vehicle cabin. Thus, in a case that the determination of whether the portable device is within the vehicle cabin is performed by the determination of whether the portable device is located within the large space, a situation is allowed to be avoided that the portable device actually within the vehicle cabin is erroneously determined as being located in the outside of the vehicle cabin.

Here, the small space is not required to be completely contained in the vehicle cabin. That is, a space a part of which extends beyond the vehicle cabin but a major part of which is contained in the vehicle cabin may be adopted as the small space of the present aspect. Further, the large space is not required to completely contain the entirety of the vehicle cabin. That is, a space which does not contain a part of the vehicle cabin but contains a major part of the vehicle cabin may be adopted as the large space of the present aspect.

The selection part of the in-vehicle device selects the small space information or the large space information. Then, on the basis of the received signal strengths contained in the response signals received by the in-vehicle receiving part and on the basis of the small space information or the large space information selected by the selection part, the vehicle cabin inside-or-outside determination part of the in-vehicle device determines whether the portable device is within the vehicle cabin.

Here, the determination of the position of the portable device performed by the vehicle cabin inside-or-outside determination part is referred to as vehicle cabin inside-or-outside determination.

Thus, the in-vehicle device selects the small space information or the large space information in accordance with the situation so as to be allowed to suitably switch the detection characteristics for the position of the portable device. For example, in a case that the in-vehicle device selects the small space information, even when an influence is caused by a signal partly leaking from the inside of the vehicle cabin through a portion of the vehicle to the outside of the vehicle cabin, a situation is allowed to be avoided that the portable device actually located in the outside of the vehicle cabin is erroneously determined as being within the vehicle cabin. Further, in a case that the in-vehicle device selects the large space information, a situation is allowed to be avoided that the portable device actually within the vehicle cabin is erroneously determined as being located in the outside of the vehicle cabin. This permits reliable detection of the portable device within the vehicle cabin.

(2) A configuration is preferable that a vehicle state detection part detecting a state of the vehicle is provided and that the selection part, in accordance with the state detected by the vehicle state detection part, selects the large space information or the small space information.

In the present disclosure, The vehicle state detection part detects the state of the vehicle. For example, the states of the vehicle include: the lock state and the open-or-closed state of the door of the vehicle; the state of the outside-the-vehicle switch provided in the door of the vehicle; and the operating state of the motor. The selection part selects the small space information or the large space information in accordance with the state of the vehicle so as to be allowed to suitably switch the detection characteristics for the position of the portable device.

(3) A configuration is preferable that the vehicle state detection part includes: a lock state detection part detecting a lock state of a door of the vehicle; an open-or-closed state detection part detecting an open-or-closed state of the door of the vehicle; and a switch state detection part detecting a state of an outside-the-vehicle switch provided in the door of the vehicle.

In the present disclosure, the small space information or the large space information is selected in accordance with the lock state and the open-or-closed state of the door of the vehicle and the state of the outside-the-vehicle switch provided in the door of the vehicle, so that the detection characteristics for the position of the portable device is allowed to be suitably switched.

The lock state and the open-or-closed state of the door of the vehicle and the state of the outside-the-vehicle switch provided in the door of the vehicle are allowed to be used as information for estimating whether the user carrying the portable device stays in the inside of the vehicle cabin and hence priority is to be imparted to reliable detection of the portable device within the vehicle cabin. Further, the individual states are allowed to be used as information for estimating whether the door of the vehicle is locked and hence priority is to be imparted to prevention of a situation that the portable device actually located in the outside of the vehicle cabin is erroneously determined as being within the vehicle cabin.

For example, in a case that a situation that the user stays in the inside of the vehicle cabin is expected on the basis of the individual states, the selection part selects the large space information for the purpose of reliable detection of the portable device within the vehicle cabin. In a case that the individual states indicate a situation that the user stays in the outside of the vehicle cabin and the door of the vehicle is locked, the small space information is selected in order that a situation may reliably be avoided that the portable device actually located in the outside of the vehicle cabin is erroneously determined as being within the vehicle cabin. Here, the above-described selection method for the small space information and the large space information is exemplary and hence employable methods are not limited to this.

(4) A configuration is preferable that the selection part, in a case that the open-or-closed state detection part has detected an opened state of the door of the vehicle in a situation that the door of the vehicle is unlocked, selects the large space information.

In the present disclosure, in a case that the door of the vehicle is unlocked and then goes into an opened state, a situation is highly expected that the user goes in and out the vehicle cabin and that the portable device within the vehicle cabin is required to be detected. Thus, the selection part selects the large space information. When the large space information is selected, the in-vehicle device is allowed to reliably detect the portable device within the vehicle cabin.

(5) A configuration is preferable that the selection part, in a case that the small space information has been selected and the open-or-closed state detection part has not detected an opened state of the door of the vehicle in a situation that the door of the vehicle is unlocked, maintains the selection of the small space information.

In the present disclosure, in a case that the selection part has selected the small space information and the unlocking and the opened state of the door of the vehicle have not been detected, the state that the small space information is selected is maintained. That is, when the small space state is once selected, the state is maintained. Then, at the time that a special condition is satisfied, the selection part selects the large space information.

(6) A configuration is preferable that the selection part, in a case that the switch state detection part has detected operation of the outside-the-vehicle switch in a situation that the door of the vehicle is unlocked, selects the small space information.

In the present disclosure, in a case that the outside-the-vehicle switch is operated in a situation that the door of the vehicle is unlocked, there is a possibility that locking has been performed in a situation that the user does not stay in the inside of the vehicle cabin. Thus, the selection part selects the small space information. When the small space information is selected, a situation is allowed to be avoided that the portable device actually located in the outside of the vehicle cabin is erroneously determined as being within the vehicle cabin.

(7) A configuration is preferable that the selection part, in a case that the large space information has been selected and the switch state detection part has not detected operation of the outside-the-vehicle switch in a situation that the door of the vehicle is unlocked, maintains the selection of the large space information.

In the present disclosure, in a case that the selection part has selected the large space information and the locking of the door of the vehicle has not been detected, the state that the large space information is selected is maintained. That is, when the large space state is once selected, the state is maintained. Then, at the time that a special condition is satisfied, the selection part selects the small space information.

(8) A configuration is preferable that the vehicle cabin inside-or-outside determination part includes: an area inside-or-outside determination part determining whether the portable device is located within each of a plurality of areas different from each other but each containing in common the small space or the large space; and a determination part determining whether the portable device is located within every area.

In the present disclosure, the area inside-or-outside determination part of the in-vehicle device determines whether the portable device is located within each of the plurality of areas different from each other. In the following description, the determination performed by the area inside-or-outside determination part is referred to as inside-or-outside determination. Each of the plurality of areas contains a common small space. Then, a part of the boundary of each area accurately follows a part of the boundary of the small space on which the inside-or-outside determination is to be performed. However, the boundary of each area does not completely agree with the boundary of the small space. Thus, the number of processes required for generation of parameters used for determining whether the portable device is located on the inner side or the outer side of the boundary in each area is suppressed.

The determination part of the present disclosure determines whether the portable device is located within every area. For example, in a case that the portable device is located within the common small space, it is determined that the portable device is located within every one of the plurality of areas in the inside-or-outside determination. In a case that the portable device is located on the outer side of the common small space, it is determined that the portable device is located on the outer side of at least one area among the plurality of areas. The plurality of areas are generated such that all areas having been combined with each other accurately follow the boundary of the small space on which the determination of whether the portable device is located on the inner side or the outer side of the vehicle cabin is to be performed. Thus, in the small space on which the determination is to be performed, whether the portable device is located on the inner side or the outer side is allowed to be accurately determined.

Also in the large space information, similarly, the number of processes required for parameter generation is allowed to be reduced. Further, whether the portable device is located on the inner side or the outer side of the large space is allowed to be accurately determined.

(9) The in-vehicle device according to an aspect of the present disclosure is an in-vehicle device transmitting a signal from a plurality of antennas provided in a vehicle and receiving a response signal transmitted from a portable device in accordance with the signal, comprising: an in-vehicle receiving part receiving the response signals containing received signal strengths of the signals individually transmitted from the plurality of antennas measured at the portable device; a storage part storing small space information concerning a small space contained in a vehicle cabin and large space information concerning a large space larger than the small space and containing the vehicle cabin; a selection part selecting the small space information or the large space information stored in the storage part; and a vehicle cabin inside-or-outside determination part, on the basis of the received signal strengths contained in the response signals received by the in-vehicle receiving part and on the basis of the small space information or the large space information selected by the selection part, determining whether the portable device is within the vehicle cabin.

In the present disclosure, the selection part of the in-vehicle device selects the small space information or the large space information stored in the storage part. Then, on the basis of the received signal strengths contained in the response signals received by the in-vehicle receiving part and on the basis of the small space information or the large space information selected by the selection part, the vehicle cabin inside-or-outside determination part of the in-vehicle device determines whether the portable device is within the vehicle cabin.

Thus, similarly to aspect (1) of the present disclosure, the in-vehicle device selects the small space information or the large space information in accordance with the situation so as to be allowed to suitably switch the detection characteristics for the position of the portable device. That is, in a case that the in-vehicle device selects the small space information, even when an influence is caused by a signal partly leaking from the inside of the vehicle cabin through a portion of the vehicle to the outside of the vehicle cabin, a situation is allowed to be avoided that the portable device actually located in the outside of the vehicle cabin is erroneously determined as being within the vehicle cabin. Further, in a case that the in-vehicle device selects the large space information, a situation is allowed to be avoided that the portable device actually within the vehicle cabin is erroneously determined as being located in the outside of the vehicle cabin. This permits reliable detection of the portable device within the vehicle cabin.

(10) The portable device according to an aspect of the present disclosure is a portable device receiving a plurality of signals transmitted from a vehicle and transmitting response signals in accordance with the received signals, comprising: a measurement part measuring received signal strengths of the plurality of signals; a storage part storing small space information concerning a small space contained in a vehicle cabin and large space information concerning a large space larger than the small space and containing the vehicle cabin; a selection part selecting the small space information or the large space information stored in the storage part; and a vehicle cabin inside-or-outside determination part, on the basis of the received signal strengths measured by the measurement part and on the basis of the small space information or the large space information selected by the selection part, determining whether itself is within the vehicle cabin.

In the present disclosure, the selection part of the portable device selects the small space information or the large space information stored in the storage part. Then, on the basis of the received signal strengths measured by the measurement part and on the basis of the small space information or the large space information selected by the selection part, the vehicle cabin inside-or-outside determination part of the portable device determines whether itself is within the vehicle cabin.

Thus, similarly to aspect (1) of the present disclosure, the portable device selects the small space information or the large space information in accordance with the situation so as to be allowed to suitably switch the detection characteristics for the own position.

(11) The computer program according to an aspect of the present disclosure is a computer program causing a computer to, on the basis of the received signal strengths of signals transmitted from a plurality of antennas provided in a vehicle and received by a portable device, determine whether the portable device is within the vehicle cabin, wherein the computer is caused to serve as: a selection part selecting small space information concerning a small space contained in a vehicle cabin or large space information concerning a large space larger than the small space and containing the vehicle cabin; and a vehicle cabin inside-or-outside determination part, on the basis of the received signal strengths and on the basis of the small space information or the large space information selected by the selection part, determining whether the portable device is within the vehicle cabin.

In the present disclosure, the computer executing the computer program of the present disclosure selects the small space information or the large space information. Then, on the basis of the received signal strengths of the signals transmitted from the plurality of antennas provided in the vehicle and then received by the portable device and on the basis of the small space information or the large space information having been selected, the computer determines whether the portable device is located in the inside of the vehicle cabin.

Thus, similarly to aspect (1) of the present disclosure, the computer selects the small space information or the large space information in accordance with the situation so as to be allowed to suitably switch the detection characteristics for the own position.

[Details of Embodiments of Present Invention]

Detailed examples of the vehicle-use communication system, the in-vehicle device, the portable device, and the computer program according to embodiments of the present invention are described below with reference to the drawings. Here, the present invention is not limited to these examples and is defined by the scope of the claims and intended to include all changes within the scope of the claims and the scope or the meaning equivalent thereto.

It is to be noted that, as used herein and in the appended claims, the singular forms "a", "an", and "the" include plural referents unless the context clearly dictates otherwise.

(Embodiment 1)

FIG. 1 is a block diagram illustrating an exemplary configuration of a vehicle-use communication system according to Embodiment 1. The vehicle-use communication system according to the present Embodiment 1 includes: an in-vehicle device 1 transmitting and receiving various signals through a plurality of transmitting antennas (3) and a receiving antenna 4 provided in a vehicle C; and a portable device 2 transmitting and receiving signals to and from the in-vehicle device 1.

For example, the plurality of transmitting antennas (3) includes: a first transmitting antenna 31 provided in a pillar on the driver side; a second transmitting antenna 32 provided in a pillar on the passenger side; a third transmitting antenna 33 provided in a back door; and a fourth transmitting antenna 34 provided in a front part of the vehicle C. The receiving antenna 4 is provided at an appropriate location of the vehicle C. Here, in the present Embodiment 1, the right side in the traveling direction of the vehicle C corresponds to the driver side and the left side in the traveling direction corresponding to the passenger side.

The in-vehicle device 1 successively transmits a signal used for determining the position of the portable device 2, as a radio signal from the plurality of transmitting antennas (3). The portable device 2 receives the signal transmitted from each transmitting antenna (3) and then measures the received signal strength of each received signal. The portable device 2 transmits a response signal containing the measured received signal strength, as a radio signal to the in-vehicle device 1. The in-vehicle device 1 receives the response signal transmitted from the portable device 2 and then, on the basis of the received signal strengths contained in the received response signals, performs vehicle cabin inside-or-outside determination of the portable device 2. After that, the in-vehicle device 1 executes given processing corresponding to the determination result. For example, the in-vehicle device 1 executes the processing of locking or unlocking of a door of the vehicle (referred to as a vehicle door, hereinafter), engine start, warning of a locking failure in a vehicle door, or the like.

Figure 2:
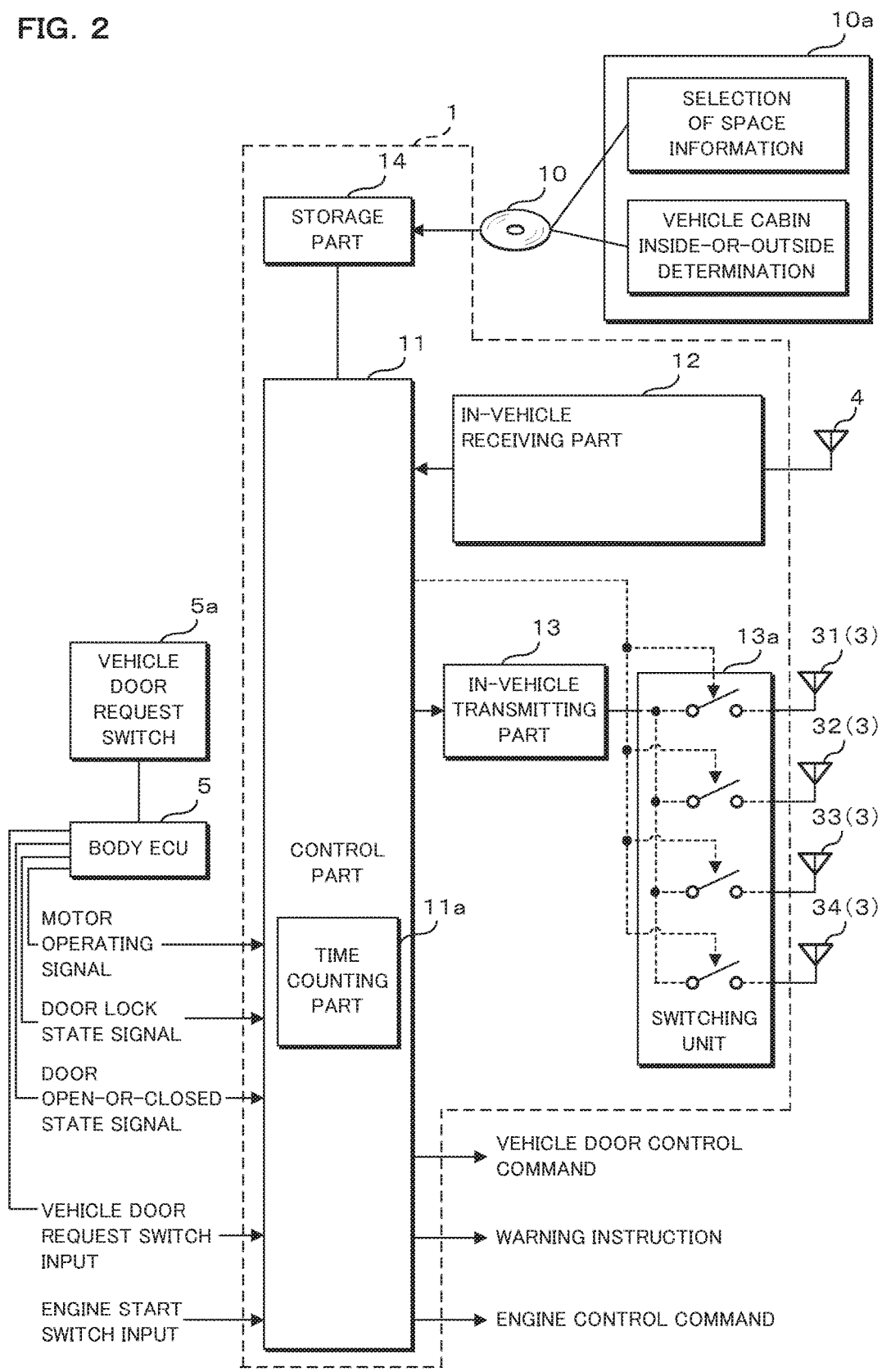
FIG. 2 is a block diagram illustrating an exemplary configuration of an in-vehicle device.

FIG. 2 is a block diagram illustrating an exemplary configuration of the in-vehicle device 1. The in-vehicle device 1 includes a control part 11 controlling the operation of each constituting part of the in-vehicle device 1. The control part 11 includes an in-vehicle receiving part 12, an in-vehicle transmitting part 13, a switching unit 13a, and a storage part 14.

For example, the control part 11 is constructed from a microcomputer including one or a plurality of CPUs (Central Processing Units), multi-core CPUs, ROMs (Read Only Memories), RAMs (Random Access Memories), input/output interfaces, time counting parts 11a, and the like. The CPU of the control part 11 is connected through the input/output interface to the in-vehicle receiving part 12, the in-vehicle transmitting part 13, and the storage part 14. The control part 11 executes a later-described computer program 10a stored in the storage part 14 so as to control the operation of each constituting part and thereby executes vehicle cabin inside-or-outside determination of the portable device 2 and given processing corresponding to the vehicle cabin inside-or-outside determination.

The storage part 14 is constructed from a non-volatile memory such as an EEPROM (Electrically Erasable Programmable ROM) and a flash memory. The storage part 14 stores a computer program 10a used for operation that the control part 11 controls the operation of each constituting part of the in-vehicle device 1 so as to execute the vehicle cabin inside-or-outside determination of the portable device 2. Further, as information for the vehicle cabin inside-or-outside determination of the portable device 2, the storage part 14 stores: small space information concerning a small space 60a contained in the vehicle cabin R; and large space information concerning a large space 60b larger than the small space 60a and containing the entirety of the vehicle cabin R (see FIGS. 4A and 4B and FIGS. 5A and 5B). Details of the small space information and the large space information are described later. Here, in FIG. 2, the control part 11 and the storage part 14 are illustrated as separate constituting parts from each other. Instead, the storage part 14 may be provided in the inside of the control part 11.

The computer program 10a according to the present Embodiment 1 may be in the form of being recorded in a recording medium 10 in a computer readable manner. Then, the storage part 14 stores the computer program 10a having been read from the recording medium 10 by a reading device (not illustrated). The recording medium 10 is constructed from: an optical disc such as a CD (Compact Disc)-ROM, a DVD (Digital Versatile Disc)-ROM, and a BD (Blu-ray (registered trademark) Disc); a magnetic disk such as a flexible disk and a hard disk; a magneto-optical disc; a semiconductor memory; or the like. Further, the computer program 10a according to the present Embodiment 1 may be downloaded from an external computer (not illustrated) connected to a communication network (not illustrated) and then may be stored into the storage part 14.

The in-vehicle receiving part 12 is connected to the receiving antenna 4. Through the receiving antenna 4, the in-vehicle receiving part 12 receives the response signal transmitted from the portable device 2 by wireless. The in-vehicle receiving part 12 is a circuit removing a carrier component from the received response signal so as to extract the received signal and then outputting the extracted received signal to the control part 11. The Ultra High Frequency band (the UHF band) from 300 MHz to 3 GHz is employed as the carrier. However, employable frequency bands are not limited to this.

The in-vehicle transmitting part 13 is a circuit that modulates a carrier with the signal outputted from the control part 11 into a radio signal and then transmits the radio signal through one transmitting antenna (3) selected by the control part 11 and the switching unit 13a to the portable device 2. The Low Frequency band (the LF band) from 30 kHz to 300 kHz is employed as the carrier. However, employable frequency bands are not limited to this.

Further, the control part 11 of the in-vehicle device 1 receives from a body ECU (Electronic Control Unit) 5: a motor operating signal indicating the operating state of the motor such as an engine and an electric motor installed on the vehicle C; a door lock state signal indicating the lock state of the vehicle door; and a door open-or-closed state signal indicating the open-or-closed state of the vehicle door. The body ECU 5 receives signals from a vehicle door request switch 5a (an outside-the-vehicle switch), an engine start switch, a switch going ON or OFF in response to the opening or the closing of the vehicle door, and the like. Thus, the body ECU 5 recognizes the operating state of the motor, the open-or-closed state of the vehicle door, and the lock state. In response to a request from the in-vehicle device 1, the body ECU 5 outputs to the in-vehicle device 1 a motor operating signal, a door lock state signal, and a door open-or-closed state signal. On the basis of the motor operating signal, the door lock state signal, and the door open-or-closed state signal having been received, the control part 11 is allowed to recognize the operating state of the motor, the lock state of the vehicle door, and the open-or-closed state of the vehicle door. Further, a request signal in accordance with the operating state of the vehicle door request switch 5a is inputted to the control part 11. On the basis of the inputted request signal, the control part 11 is allowed to recognize the operating state of the vehicle door request switch 5a. For example, the vehicle door request switch 5a is a switch used for locking or unlocking a vehicle door on the driver side or the passenger side and is provided in the door handle in the driver-side outside or the passenger-side outside. Here, in place of a push button, a contact sensor detecting the contact of the user's hand to the door handle may be provided. Further, the control part 11 may directly acquire a request signal corresponding to the operation of the vehicle door request switch 5a or, alternatively, may acquire the request signal through an ECU such as a door ECU.

In accordance with the situations such as the operating state of the vehicle door request switch 5a and whether the portable device 2 is within the vehicle cabin, the control part 11 outputs to a door ECU (not illustrated) a vehicle door control command of controlling the unlocking or locking of the vehicle door. In accordance with the vehicle door control command from the control part 11, the door ECU locks or unlocks the vehicle door. Further, in accordance with the situation, when required, the control part 11 outputs a warning instruction to a warning device (not illustrated). For example, when the vehicle door request switch 5a is operated in a situation that the portable device 2 is within the vehicle cabin, the control part 11 outputs a warning instruction to the warning device. In accordance with the warning instruction, the warning device issues a given warning to the user of the vehicle C by using sound or light.

Further, an engine start signal corresponding to the operating state of an engine start switch (not illustrated) is inputted to the control part 11 of the in-vehicle device 1. On the basis of the inputted engine start signal, the control part 11 is allowed to recognize the operating state of the engine start switch. In accordance with the situations such as the operating state of the engine start switch and whether the portable device 2 is within the vehicle cabin, the control part 11 outputs to an engine ECU (not illustrated) an engine control command of starting or stopping the engine. In accordance with the engine control command from the control part 11, the engine ECU starts or stops the engine.

Figure 3:
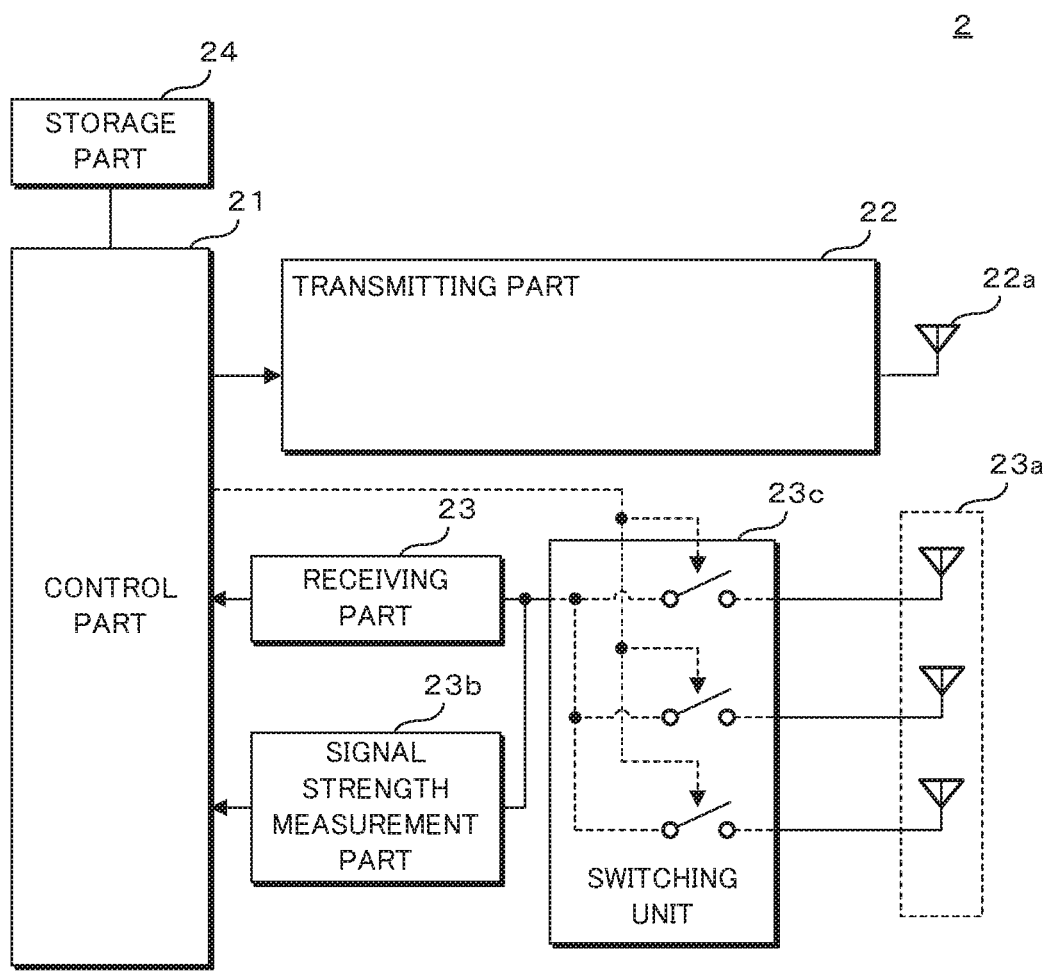
FIG. 3 is a block diagram illustrating an exemplary configuration of a portable device.

FIG. 3 is a block diagram illustrating an exemplary configuration of the portable device 2. The portable device 2 includes a control part 21 controlling the operation of each constituting part of the portable device 2. The control part 21 includes a transmitting part 22, a receiving part 23, a signal strength measurement part 23b, a switching unit 23c, and a storage part 24.

For example, the control part 21 is constructed from a microcomputer including one or a plurality of CPUs, multi-core CPUs, ROMs, RAMs, input/output interfaces, timers, and the like. The CPU of the control part 21 is connected through the input/output interface to the transmitting part 22 and the receiving part 23. The control part 21 executes a control program stored in the storage part 24 so as to control the operation of each constituting part and thereby executes various processing of transmitting information required for the vehicle cabin inside-or-outside determination of the portable device 2 to the in-vehicle device 1.

The storage part 24 is constructed from a non-volatile memory similar to the storage part 14. The storage part 24 stores the control program for operation that the control part 21 controls the operation of each constituting part of the portable device 2 so as to perform the vehicle cabin inside-or-outside determination of the portable device 2. In accordance with the control program, the control part 21 executes the processing of transmitting to the in-vehicle device 1 the response signal and the like containing the information required for the vehicle cabin inside-or-outside determination. Further, the storage part 24 stores a portable device identifier for identifying the portable device 2. Here, in FIG. 3, the control part 21 and the storage part 24 are illustrated as separate constituting parts from each other. Instead, the storage part 24 may be provided in the inside of the control part 21.

The receiving part 23 is connected through the switching unit 23c to a three-axis antenna 23a constructed such that three coils are arranged in orthogonal directions to each other. The receiving part 23 receives through the three-axis antenna 23a and the switching unit 23c the radio signal transmitted from the in-vehicle device 1. The three radio signals received by the three-axis antenna 23a are inputted into the switching unit 23c. In accordance with the control of the control part 21, the switching unit 23c selects one radio signal. The receiving part 23 is a circuit that removes a carrier component from the radio signal selected by the switching unit 23c so as to extract the received signal and then outputs the extracted received signal to the control part 21. The Low Frequency band (the LF band) from 30 kHz to 300 kHz is employed as the carrier. However, employable frequency bands are not limited to this.

Further, the portable device 2 includes the signal strength measurement part 23b that receives through the three-axis antenna 23a the radio signal transmitted from the in-vehicle device 1, then measures the received signal strength of the radio signal selected by the switching unit 23c, and then outputs to the control part 21 the measured received signal strength.

In accordance with the timing that a radio signal for signal strength measurement is transmitted from the in-vehicle device 1, the control part 21 selects each of the three radio signals from the three-axis antenna 23a and then measures the received signal strength of the selected radio signal by using the signal strength measurement part 23b. That is, in place of the received signal strength in the amplitude direction of the radio signal transmitted from the in-vehicle device 1, the control part 21 measures the components of the received signal strength in the three orthogonal directions of the three-axis antenna 23a. The control part 21 performs a vector calculation from the components of the measured received signal strength so as to calculate the received signal strength in the amplitude direction of the radio signal transmitted from the in-vehicle device 1. Thus, the control part 21 is allowed to acquire a fixed received signal strength regardless of the orientation or the attitude of the portable device 2 relative to the vehicle C. In the following description, unless otherwise mentioned in particular, the received signal strength calculated by the vector calculation is referred to as a received signal strength.

Here, an example has been described above that the control part 21 calculates the received signal strength. Instead, the received signal strength of each signal received through the three-axis antenna 23a may be transmitted from the portable device 2 to the in-vehicle device 1 and then the control part 11 of the in-vehicle device 1 may calculate the received signal strength.

The transmitting part 22 is a circuit that modulates a carrier with a response signal inputted by the control part 21 and then transmits a radio signal through a transmitting antenna 22a. The Low Frequency band (the LF band) from 30 kHz to 300 kHz is employed as the carrier. However, employable frequency bands are not limited to this.

Next, the small space information and the large space information stored in the storage part 14 of the in-vehicle device 1 are described below.

Figure 4A:
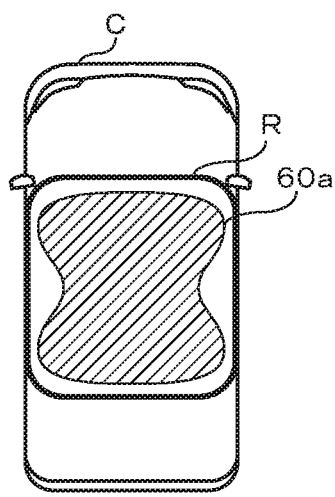
FIG. 4A is a plan view conceptually illustrating a small space.
Figure 4B:
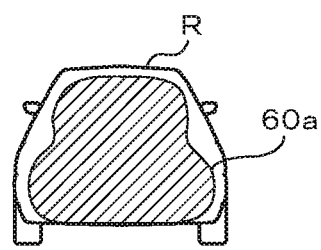
FIG. 4B is an elevation view conceptually illustrating a small space.

FIG. 4A is a plan view conceptually illustrating the small space 60a and FIG. 4B is an elevation view conceptually illustrating the small space 60a. As illustrated in FIGS. 4A and 4B, the small space 60a is a three-dimensional space contained in the vehicle cabin R. The small space information is information setting forth the small space 60a. Thus, on the basis of the received signal strengths measured by the portable device 2 having received the individual signals transmitted from the plurality of transmitting antennas (3) and on the basis of the small space information, the control part 11 is allowed to determine whether the portable device 2 is located within the small space 60a. The entirety of the small space 60a is contained on the inner side of the vehicle cabin R. Thus, when the control part 11 determines whether the portable device 2 is located within the small space 60a, a situation is allowed to be avoided that the portable device 2 actually located in the outside of the vehicle cabin is erroneously determined as being within the vehicle cabin. Here, the small space 60*a* is not required to be completely contained in the vehicle cabin R. That is, a part of the small space 60*a* may extend beyond the vehicle cabin R and it is sufficient that a major part of the small space 60*a* is contained in the vehicle cabin R.

Figure 5A:
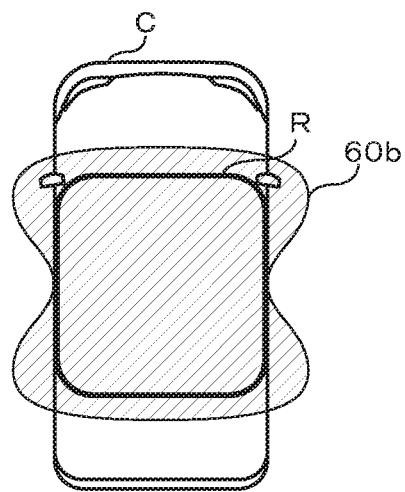
FIG. 5A is a plan view conceptually illustrating a large space.
Figure 5B:
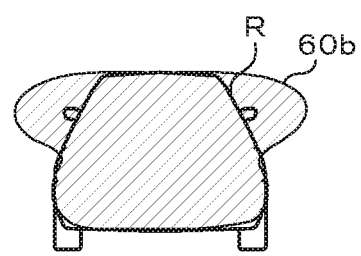
FIG. 5B is an elevation view conceptually illustrating a large space.

FIG. 5A is a plan view conceptually illustrating the large space 60*b* and FIG. 5B is an elevation view conceptually illustrating the large space 60*b*. As illustrated in FIGS. 5A and 5B, the large space 60*b* is a three-dimensional space containing the entirety of the vehicle cabin R. The large space information is information setting forth the large space 60*b*. Thus, on the basis of the received signal strengths measured by the portable device 2 having received the individual signals transmitted from the plurality of transmitting antennas (3) and on the basis of the large space information, the control part 11 is allowed to determine whether the portable device 2 is located within the large space 60*b*. The large space 60*b* contains the entirety of the vehicle cabin R. Thus, when the control part 11 determines whether the portable device 2 is located within the large space 60*b*, a situation is allowed to be avoided that the portable device 2 actually within the vehicle cabin is erroneously determined as being located in the outside of the vehicle cabin. This permits reliable detection of the portable device 2 within the vehicle cabin. Here, the large space 60*b* is not required to completely contain the entirety of the vehicle cabin R. That is, the large space 60*b* may not include a part of the vehicle cabin R and it is sufficient that the large space 60*b* include a major part of the vehicle cabin R.

Here, an example of the small space information and the large space information is described below in detail. For example, the entity of the small space information or the large space information is statistical values. The storage part 14 stores, as the small space information, statistical values setting forth a plurality of areas different from each other but each containing a common small space 60*a*. In the present Embodiment 1, the small space information contains statistical values setting forth a first area, a second area, a third area, and a fourth area.

Similarly, the storage part 14 stores, as the large space information, statistical values setting forth a plurality of areas different from each other but each containing a common large space 60*b*. In the present Embodiment 1, the large space information contains statistical values setting forth a first area, a second area, a third area, and a fourth area.

Figure 6A:
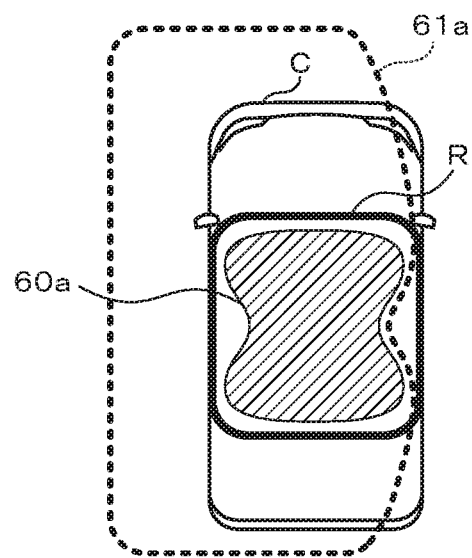
FIG. 6A is a plan view conceptually illustrating a first area of a small space.
Figure 6B:
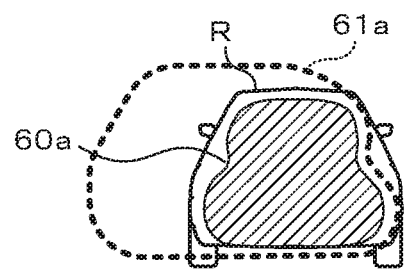
FIG. 6B is an elevation view conceptually illustrating a first area of a small space.

FIG. 6A is a plan view conceptually illustrating a first area 61*a* of the small space 60*a*. FIG. 6B is an elevation view conceptually illustrating the first area 61*a* of the small space 60*a*. The first area 61*a* is a three-dimensional space and then, as illustrated in FIGS. 6A and 6B, has a boundary following the right side face of the small space 60*a* and has a shape containing the common small space 60*a*. Thus, the left side wall, the rear wall, and the windshield part that constitute the vehicle cabin R are also contained in the first area 61*a*. In FIGS. 6A and 6B, the shaded portion indicates the small space 60*a*.

The boundary of the first area 61*a* does not completely agree with the outer face of the small space 60*a*. Thus, even when inside-or-outside determination of the portable device 2 is performed in the first area 61*a*, whether the portable device 2 is located within the small space 60*a* is not allowed to be accurately determined. However, at least a part of the boundary of the first area 61*a* substantially agrees with the right side face of the small space 60*a*. Thus, as long as the portable device 2 is located in the vicinity of the right side face of the small space 60*a*, whether the portable device 2 is located within the small space 60*a* is allowed to be accurately determined.

Figure 7A:
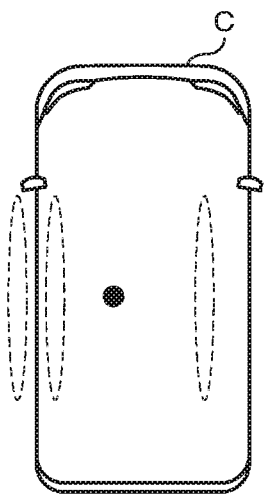
FIG. 7A is a conceptual diagram illustrating sampling locations concerning a first area of a small space.
Figure 7B:
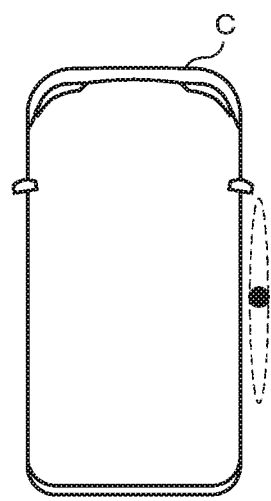
FIG. 7B is a conceptual diagram illustrating a sampling location concerning a first area of a small space.

FIGS. 7A and 7B are conceptual diagrams illustrating sampling locations concerning the first area 61*a* of the small space 60*a*. The statistical values setting forth the first area 61*a* of the small space 60*a* are calculated in the fabrication process of the vehicle-use communication system and then the storage part 14 stores the calculated statistical values. The statistical values are calculated on the basis of the sampled values of the received signal strengths measured by the portable device 2 having received each signal transmitted from the plurality of transmitting antennas (3). Here, the device measuring the sampled values of the received signal strengths may be not the portable device 2. That is, an arbitrary measuring equipment allowed to measure the strength of the signal corresponding to the received signal strength measured by the portable device 2 may be employed.

The sampled value of the received signal strength is acquired when the portable device 2 is arranged at a particular location in the inside and the outside of the vehicle C and then the received signal strength is measured. In the following description, the set of the received signal strengths measured at a plurality of locations is referred to as a sample group. As statistical values used for setting forth the first area 61*a*, the storage part 14 stores first statistical values based on a sample group characterizing the inner side of the first area 61*a* and second statistical values based on a sample group characterizing the outer side of the first area 61*a*.

FIG. 7A illustrates the arrangement of the portable device 2 used for obtaining the sampled values used for calculating the first statistical values of the small space 60*a*. Specifically, the portable device 2 is arranged at a plurality of locations along the vehicle cabin inner side of the right side face of the vehicle cabin R and at a plurality of locations along the vehicle cabin inner side and the vehicle cabin outer side of the left side face. Then, the received signal strength of the signal received by the portable device 2 is measured at each location. In a case that the portable device 2 is to be arranged along the vehicle cabin inner side of the right side face of the vehicle cabin R, the portable device 2 is arranged departing from the right side face of the vehicle cabin R toward the center part of the vehicle C by a given distance. When the portable device 2 is arranged departing toward the center part of the vehicle C, the right side face of the first area 61*a* is allowed to be deviated from the right side face of the vehicle C to the center part side. Then, the first statistical values are calculated on the basis of the sampled values of the measured received signal strengths. An ellipse of dashed line indicates a location where the portable device 2 is to be arranged.

Since four transmitting antennas (3) are employed in the present Embodiment 1, four received signal strengths are measured at one location by the portable device 2. Thus, the sample of the received signal strengths obtained at each location is of a vector quantity and hence the sample group is a group of samples each constructed from a vector. Each vector having four received signal strengths as components is referred to as a received signal strength vector.

Here, despite that the sample group is for characterizing the inner side of the small space 60*a* contained in the vehicle cabin R, as illustrated in FIG. 7A, the sample group contains also the sampled values of the received signal strengths measured in the outside of the vehicle cabin. This is for ensuring that the first area 61*a* contains the entirety of the small space 60*a*. In a case that the sample group does not contain the sampled values measured on the vehicle cabin inner side and the vehicle cabin outer side of the left side face, the sample group is overemphasized by the sampled values of the received signal strengths measured in the right side face of the vehicle C. Then, when the sample group is overemphasized by the sampled values measured in the right side face of the vehicle C, in some cases, the left side part of the small space 60a is dropped from the region of the first area 61a characterized by the sample group. Thus, in the present Embodiment 1, the sampled values of the received signal strengths are acquired with arranging the portable device 2 at the locations illustrated in FIG. 7A and then.

For example, the first statistical values concerning the first area 61a of the small space 60a are the mean vector and the inverse variance-covariance matrix of the sample group characterizing the inner side of the first area 61a. The mean vector of the sample group is expressed by the following formulas (1) and (2). The filled circle illustrated in FIG. 7A indicates a conceptual position of the mean vector.

$$\vec{\mu} = \begin{bmatrix} \mu_1 \\ \mu_2 \\ \vdots \\ \mu_N \end{bmatrix} \quad (1)$$

$$\mu_n = E[X_n] \quad (2)$$

where $\vec{\mu}$: mean vector $X_n$: sampled value of received signal strength of signal transmitted from n-th transmitting antenna n: integer N: number of transmitting antennas The variance-covariance matrix of the sample group characterizing the inner side of the first area 61a is expressed by the following formulas (3) and (4). The inverse variance-covariance matrix is the inverse matrix of the variance-covariance matrix expressed by the following formula (3). The storage part 14 stores the inverse variance-covariance matrix.

$$\Sigma = \begin{bmatrix} \Sigma_{11} & \Sigma_{12} & \ldots & \Sigma_{1N} \\ \vdots & \vdots & \ldots & \vdots \\ \Sigma_{N1} & \Sigma_{N2} & \ldots & \Sigma_{NN} \end{bmatrix} \quad (3)$$

$$\Sigma_{ij} = E[(X_i - \mu_i)(X_j - \mu_j)] \quad (4)$$

where i,j: integer

FIG. 7B illustrates the arrangement of the portable device 2 used for obtaining the sampled values used for calculating the second statistical values of the small space 60a. Specifically, the portable device 2 is arranged at a plurality of locations along the vehicle cabin outer side of the right side face of the vehicle cabin R and then the received signal strength of the signal received by the portable device 2 is measured at each location. Then, the second statistical values are calculated on the basis of the sampled values of the measured received signal strengths. The second statistical values are the mean vector and the inverse variance-covariance matrix of the sample group characterizing the outer side of the first area 61a. Similarly to the first statistical values, the mean vector and the inverse variance-covariance matrix constituting the second statistical values are expressed by the formulas (1) to (4) given above. The filled circle illustrated in FIG. 7B indicates a conceptual position of the mean vector of the sample group.

Figure 8A:
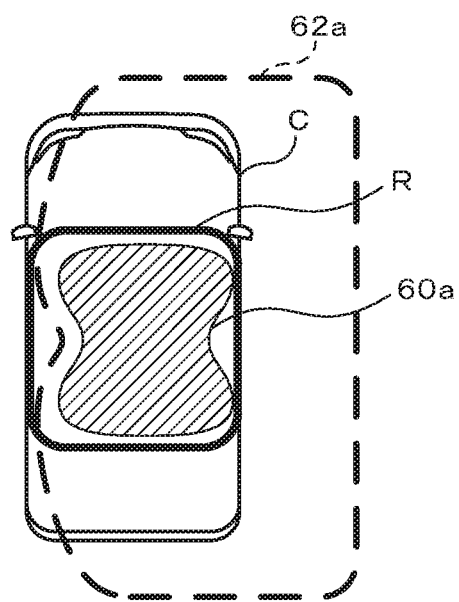
FIG. 8A is a plan view conceptually illustrating a second area of a small space.
Figure 8B:
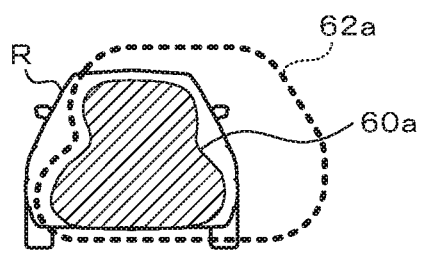
FIG. 8B is an elevation view conceptually illustrating a second area of a small space.

FIG. 8A is a plan view conceptually illustrating a second area 62a of the small space 60a. FIG. 8B is an elevation view conceptually illustrating the second area 62a of the small space 60a. The second area 62a is a three-dimensional space and then, as illustrated in FIGS. 8A and 8B, has a boundary following the left side face of the small space 60a and has a shape containing the common small space 60a. Thus, the right side wall, the rear wall, and the windshield part that constitute the vehicle cabin R are also contained in the second area 62a. In FIGS. 8A and 8B, the shaded portion indicates the small space 60a.

As statistical values used for setting forth the second area 62a, the storage part 14 stores first statistical values based on a sample group characterizing the inner side of the second area 62a and second statistical values based on a sample group characterizing the outer side of the second area 62a.

Figure 9A:
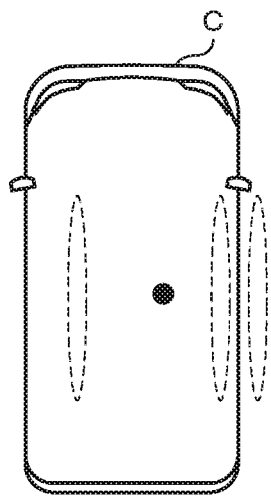
FIG. 9A is a conceptual diagram illustrating sampling locations concerning a second area of a small space.
Figure 9B:
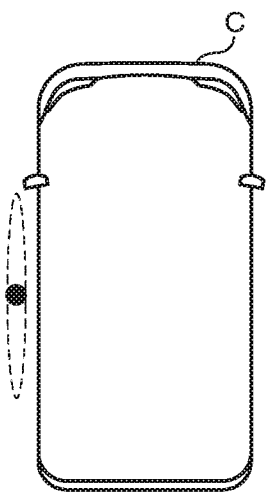
FIG. 9B is a conceptual diagram illustrating a sampling location concerning a second area of a small space.

FIGS. 9A and 9B are conceptual diagrams illustrating sampling locations concerning the second area 62a of the small space 60a. The sampled values of the received signal strengths used for calculating the first statistical values and the second statistical values that set forth the second area 62a are obtained by a method that the portable device 2 is arranged at particular locations in the inside and the outside of the vehicle C illustrated in FIGS. 9A and 9B and then the received signal strengths are measured.

FIG. 9A illustrates the arrangement of the portable device 2 used for obtaining the sampled values used for calculating the first statistical values of the small space 60a. Specifically, the portable device 2 is arranged at a plurality of locations along the vehicle cabin inner side of the left side face of the vehicle cabin R and at a plurality of locations along the vehicle cabin inner side and the vehicle cabin outer side of the right side face. Then, the received signal strength of the signal received by the portable device 2 is measured at each location. In a case that the portable device 2 is to be arranged along the vehicle cabin inner side of the left side face of the vehicle cabin R, the portable device 2 is arranged departing from the left side face of the vehicle cabin R toward the center part of the vehicle C by a given distance. When the portable device 2 is arranged departing toward the center part of the vehicle C, the left side face of the second area 62a is allowed to be deviated from the left side face of the vehicle C to the center part side. Then, the first statistical values are calculated on the basis of the sampled values of the measured received signal strengths. The first statistical values are the mean vector and the inverse variance-covariance matrix of the sample group characterizing the inner side of the second area 62a.

FIG. 9B illustrates the arrangement of the portable device 2 used for obtaining the sampled values used for calculating the second statistical values of the small space 60a. Specifically, the portable device 2 is arranged at a plurality of locations along the vehicle cabin outer side of the left side face of the vehicle cabin R and then the received signal strength of the signal received by the portable device 2 is measured at each location. Then, the second statistical values are calculated on the basis of the sampled values of the measured received signal strengths. Similarly to the first statistical values, the second statistical values are the mean vector and the inverse variance-covariance matrix of the sample group characterizing the outer side of the second area 62a.

Figure 10A:
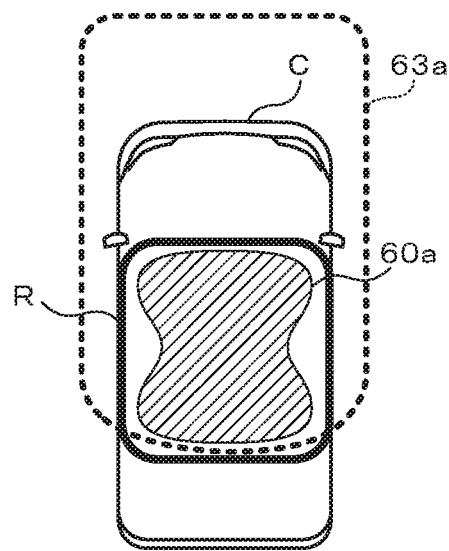
FIG. 10A is a conceptual diagram illustrating a third area of a small space.
Figure 10B:
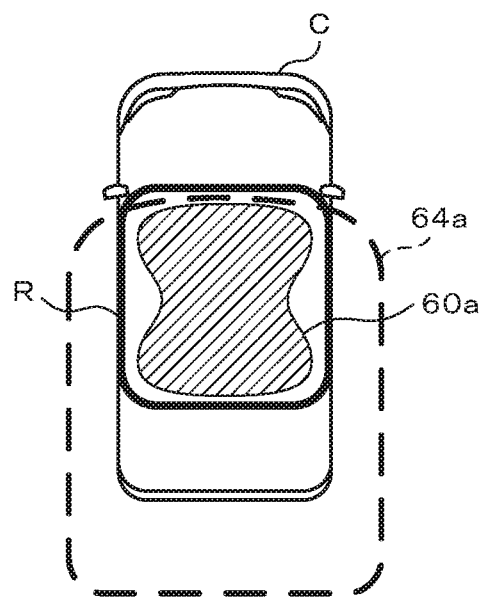
FIG. 10B is a conceptual diagram illustrating a fourth area of a small space.

FIG. 10A is a conceptual diagram illustrating the third area 63a of the small space 60a and FIG. 10B is a conceptual diagram illustrating the fourth area 64a of the small space 60a. Each of the third area 63a and the fourth area 64a is a three-dimensional space. As illustrated in FIG. 10A, the third area 63a has a boundary following the rear face of the small space 60a and has a shape containing the entirety of the common small space 60a. As illustrated in FIG. 10B, the fourth area 64a has a boundary following the front face of the small space 60a and has a shape containing the entirety of the common small space 60a.

Figure 11:
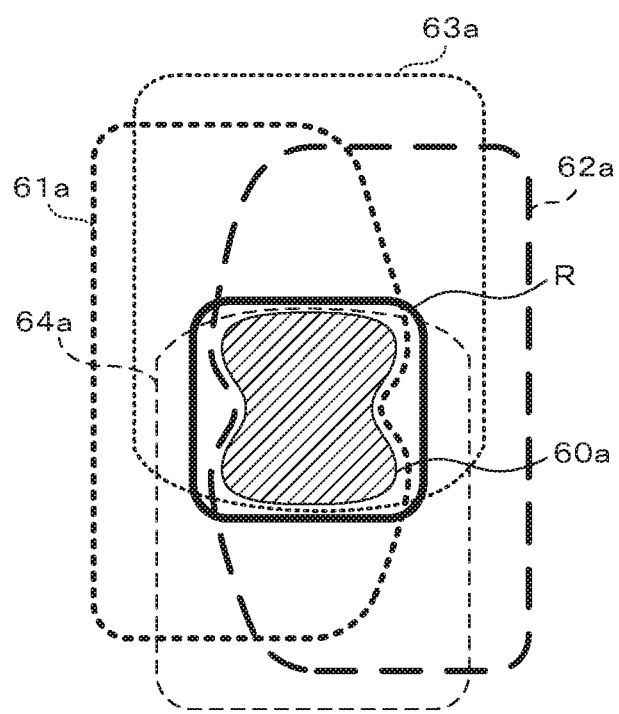
FIG. 11 is a conceptual diagram illustrating an area corresponding to a small space.

FIG. 11 is a conceptual diagram illustrating an area corresponding to the small space 60a. The shaded region illustrated in FIG. 11 is an area corresponding to the small space 60a. Each of the first to the fourth area 61a, 62a, 63a, and 64a concerning the small space 60a contains the common small space 60a. Then, the boundary of each of the first to the fourth area 61a, 62a, 63a, and 64a follows the right side face, the left side face, the rear face, or the front face of the small space 60a. Thus, the space located within every one of the first to the fourth area 61a, 62a, 63a, and 64a substantially agrees with the small space 60a.

Figure 12A:
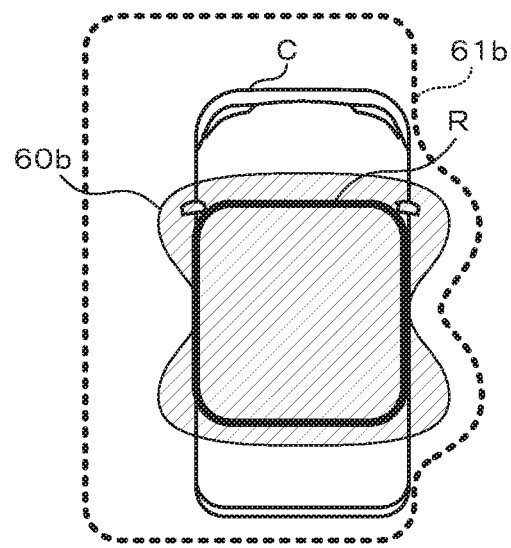
FIG. 12A is a plan view conceptually illustrating a first area of a large space.
Figure 12B:
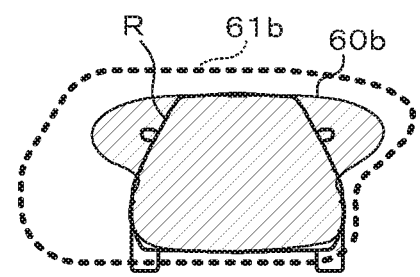
FIG. 12B is an elevation view conceptually illustrating a first area of a large space.

FIG. 12A is a plan view conceptually illustrating a first area 61b of the large space 60b. FIG. 12B is an elevation view conceptually illustrating the first area 61b of the large space 60b. The first area 61b of the large space 60b is a three-dimensional space and then, as illustrated in FIGS. 12A and 12B, has a boundary following the right side face of the large space 60b and has a shape containing the common large space 60b. Thus, the left side wall, the rear wall, and the windshield part that constitute the vehicle cabin R are also contained in the first area 61b. In FIGS. 12A and 12B, the shaded portion indicates the large space 60b.

Figure 13A:
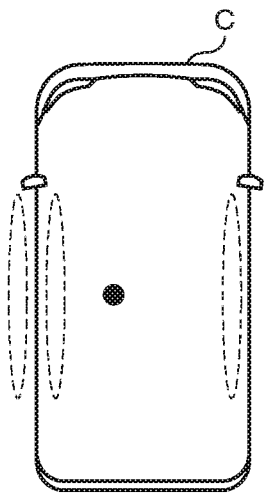
FIG. 13A is a conceptual diagram illustrating sampling locations concerning a first area of a large space.
Figure 13B:
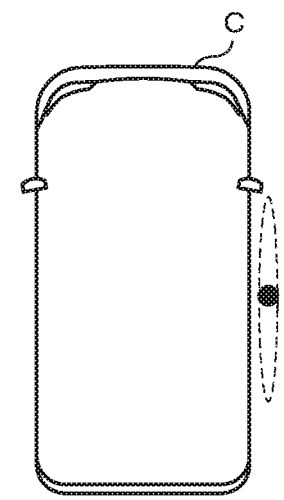
FIG. 13B is a conceptual diagram illustrating a sampling location concerning a first area of a large space.

FIGS. 13A and 13B are conceptual diagrams illustrating sampling locations according to the first area 61b of the large space 60b. The statistical values setting forth the first area 61b of the large space 60b are calculated similarly to the statistical values setting forth the first area 61a of the small space 60a. Then, the storage part 14 stores the calculated statistical values.

FIG. 13A illustrates the arrangement of the portable device 2 used for obtaining the sampled values used for calculating the first statistical values of the large space 60b. Specifically, the portable device 2 is arranged at a plurality of locations along the vehicle cabin inner side of the right side face of the vehicle cabin R and at a plurality of locations along the vehicle cabin inner side and the vehicle cabin outer side of the left side face. Then, the received signal strength of the signal received by the portable device 2 is measured at each location. At the time that the portable device 2 is arranged along the vehicle cabin inner side of the right side face of the vehicle cabin R, the portable device 2 is arranged at a position closer to the right side face in comparison with a case that the first statistical values of the small space 60a are to be calculated. Then, the first statistical values are calculated on the basis of the sampled values of the measured received signal strengths. For example, the first statistical values concerning the first area 61b of the large space 60b are the mean vector and the inverse variance-covariance matrix of the sample group characterizing the inner side of the first area 61b.

FIG. 13B illustrates the arrangement of the portable device 2 used for obtaining the sampled values used for calculating the second statistical values of the large space 60b. Specifically, the portable device 2 is arranged at a plurality of locations along the vehicle cabin outer side of the right side face of the vehicle cabin R and then the received signal strength of the signal received by the portable device 2 is measured at each location. Then, the second statistical values are calculated on the basis of the sampled values of the measured received signal strengths. The second statistical values are the mean vector and the inverse variance-covariance matrix of the sample group characterizing the outer side of the first area 61b.

Figure 14A:
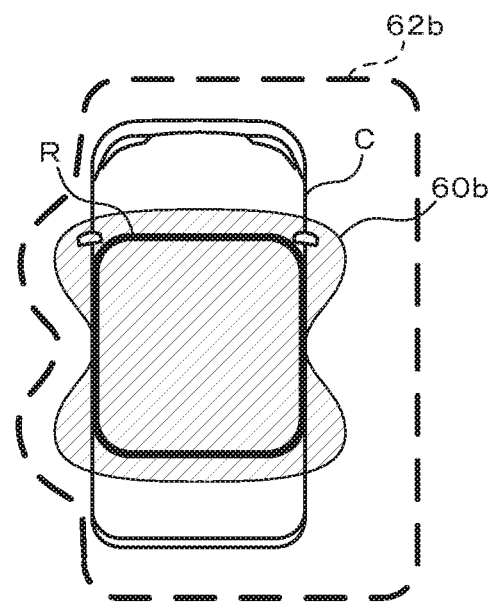
FIG. 14A is a plan view conceptually illustrating a second area of a large space.
Figure 14B:
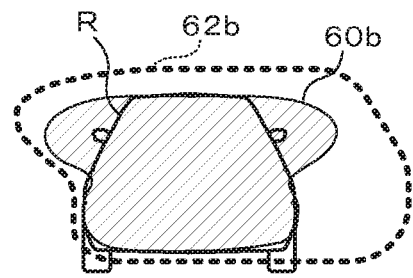
FIG. 14B is an elevation view conceptually illustrating a second area of a large space.

FIG. 14A is a plan view conceptually illustrating a second area 62b of the large space 60b. FIG. 14B is an elevation view conceptually illustrating the second area 62b of the large space 60b. The second area 62b is a three-dimensional space and then, as illustrated in FIGS. 14A and 14B, has a boundary following the left side face of the large space 60b and has a shape containing the common large space 60b. Thus, the right side wall, the rear wall, and the windshield part that constitute the vehicle cabin R are also contained in the second area 62b. In FIGS. 14A and 14B, the shaded portion indicates the large space 60b.

As statistical values used for setting forth the second area 62b, the storage part 14 stores first statistical values based on a sample group characterizing the inner side of the second area 62b and second statistical values based on a sample group characterizing the outer side of the second area 62b.

Figure 15A:
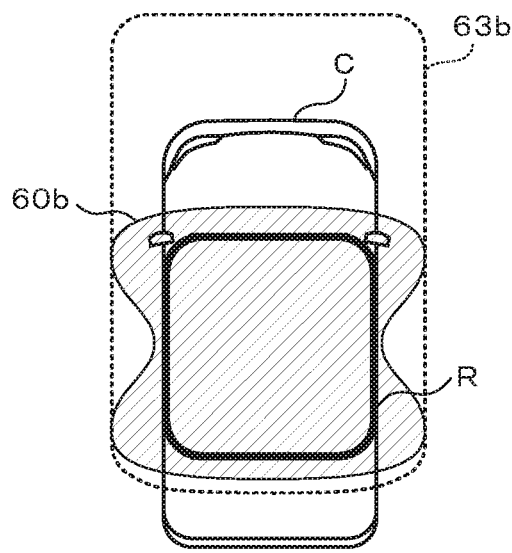
FIG. 15A is a conceptual diagram illustrating a third area of a large space.
Figure 15B:
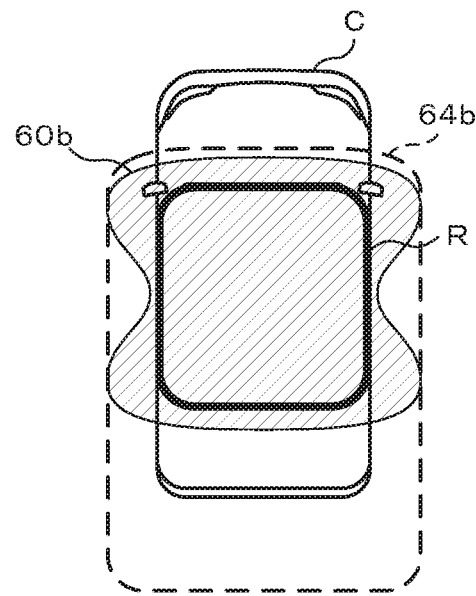
FIG. 15B is a conceptual diagram illustrating a fourth area of a large space.

FIG. 15A is a conceptual diagram illustrating the third area 63b of the large space 60b and FIG. 15B is a conceptual diagram illustrating the fourth area 64b of the large space 60b. Each of the third area 63b and the fourth area 64b is a three-dimensional space. As illustrated in FIG. 15A, the third area 63b has a boundary following the rear face of the large space 60b and has a shape containing the entirety of the common large space 60b. As illustrated in FIG. 15B, the fourth area 64b has a boundary following the front face of the large space 60b and has a shape containing the entirety of the common large space 60b.

Each of the first to the fourth area 61b, 62b, 63b, and 64b concerning the large space 60b contains the common large space 60b. Then, the boundary of each of the first to the fourth area 61b, 62b, 63b, and 64b follows the right side face, the left side face, the rear face, or the front face of the large space 60b. Thus, the space located within every one of the first to the fourth area 61b, 62b, 63b, and 64b substantially agrees with the large space 60b.

FIG. 16 is a flow chart illustrating a procedure of processing performed in response to an operation request. When an operation request is inputted from the outside, the in-vehicle device 1 and the portable device 2 execute the following processing. Here, for example, the operation request indicates: a request of locking or unlocking of the vehicle door made on the basis of operation of the vehicle door request switch; and a request of engine start or stop made on the basis of the operation of the engine start switch. For example, when a request signal in response to the operation of the vehicle door request switch is inputted to the in-vehicle device 1 or, alternatively, when an engine start signal in response to the operation of the engine start switch is inputted to the portable device 21, the in-vehicle device 1 starts the processing.

The control part 11 of the in-vehicle device 1 causes the in-vehicle transmitting part 13 to transmit a wake up signal from the transmitting antenna (3) (step S101).

The control part 21 of the portable device 2 having received the wake up signal in the receiving part 23 starts up from a sleep state into an active state and then transmits an own portable device identifier from the transmitting part 22 to the in-vehicle device 1 (step S102).

The control part 11 of the in-vehicle device 1 receives through the in-vehicle receiving part 12 the portable device identifier transmitted from the portable device 2. Then, by using the received portable device identifier, the control part 11 generates data for authentication and then causes the in-vehicle transmitting part 13 to transmit a challenge signal containing the data from the transmitting antenna (3) (step S103).

The control part 21 receives the challenge signal through the receiving part 23. Then, by using the data contained in the received challenge signal, the control part 21 checks the validity of the in-vehicle device 1. If the validity of the in-vehicle device 1 is concluded, the control part 21 generates data used for authentication of the portable device 2 by the in-vehicle device 1, and then transmits a response signal containing the data from the transmitting part 22 to the in-vehicle device 1 (step S104).

The control part 11 of the in-vehicle device 1 receives through the in-vehicle receiving part 12 the response signal transmitted from the portable device 2, and then performs the authentication of the portable device 2 by using the data contained in the received response signal (step S105). If it is determined that the authentication has been successful (step S105: YES), the control part 11 executes a subroutine of vehicle cabin inside-or-outside determination processing for the portable device 2 (step S106). That is, the control part 11 performs determination of whether the portable device 2 is within the vehicle cabin or in the outside of the vehicle cabin. The result of the vehicle cabin inside-or-outside determination is expressed by a numeral value. For example, when the portable device 2 is within the vehicle cabin, the numerical value of the vehicle cabin inside-or-outside determination result is premised to be 1. Further, when the portable device 2 is located in the outside of the vehicle cabin, the numerical value of the vehicle cabin inside-or-outside determination result is premised to be 0.

Then, the control part 11 determines whether the result of the vehicle cabin inside-or-outside determination is consistent with an expected value set forth in advance in accordance with the contents of the operation request (step S107). For example, the expected value corresponding to the operation of unlocking the vehicle door based on the operation of the vehicle door request switch 5a is 0 and the expected value corresponding to the operation of engine start is 1.

If it is determined that the result of the vehicle cabin inside-or-outside determination is consistent with the expected value (step S107: YES), the control part 11 accepts the operation request and then executes the processing corresponding to the operation request (step S108). For example, in a case that the vehicle door request switch 5a is operated, the control part 11 executes the processing of outputting to the door ECU a vehicle door control signal instructing the locking or unlocking of the vehicle door. In a case that the engine start switch is operated, the control part 11 executes the processing of outputting to the engine ECU an engine control command of starting or stopping the engine.

If it is determined that the result of the vehicle cabin inside-or-outside determination is not consistent with the expected value (step S107: NO) or, alternatively, if it is determined that the authentication of the portable device 2 has been failed (step S105: NO), the control part 11 rejects the operation request and executes the processing of request rejection (step S109), and then terminates the processing. For example, the processing of request rejection is such processing that when the engine start switch has been operated but the portable device 2 is not within the vehicle cabin, a warning beep is generated. Here, the processing of request rejection is not indispensable.

Figure 17:
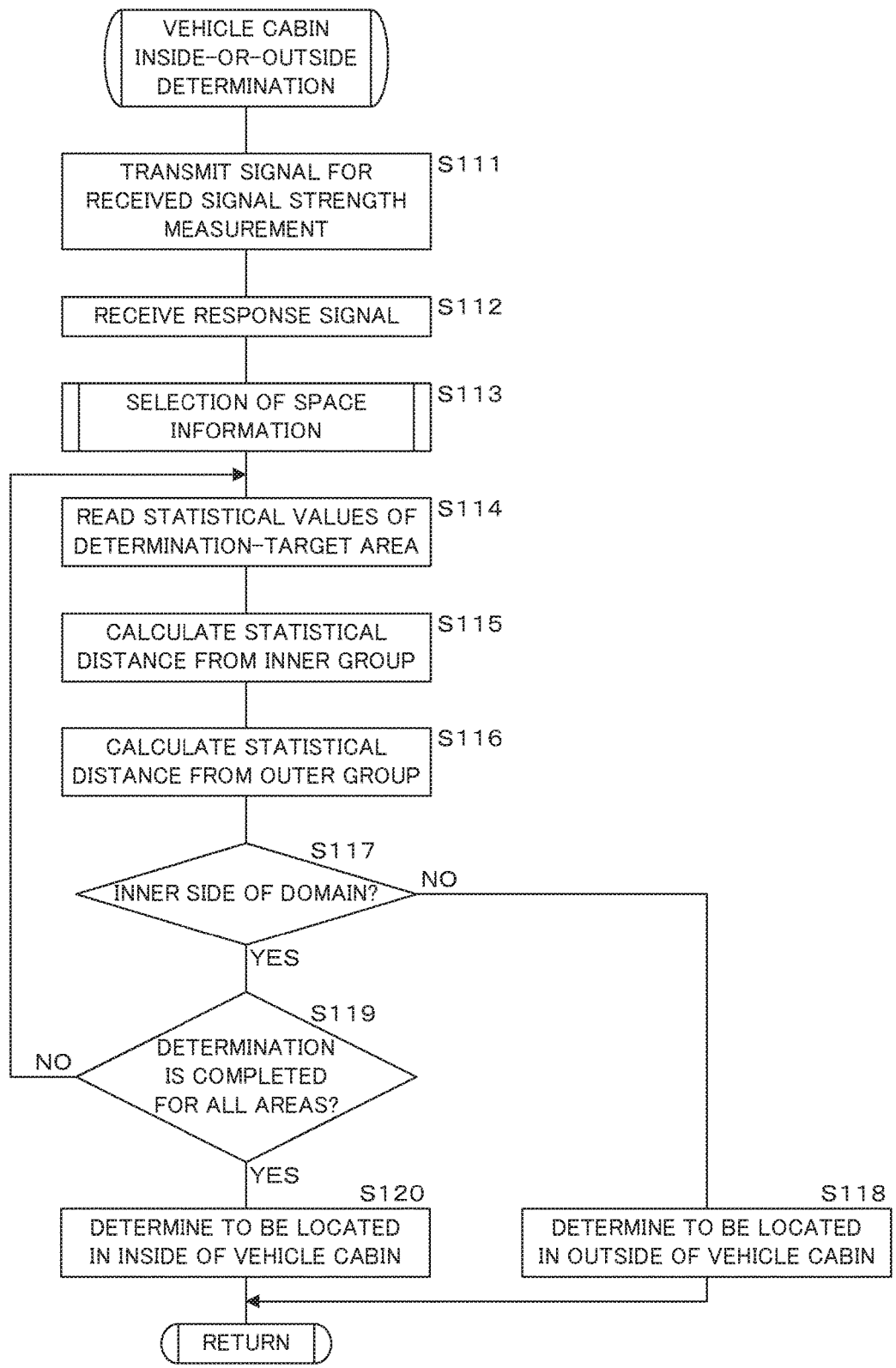
FIG. 17 is a flow chart illustrating a processing procedure of a vehicle cabin inside-or-outside determination subroutine in Embodiment 1.

FIG. 17 is a flow chart illustrating a processing procedure of the vehicle cabin inside-or-outside determination subroutine in Embodiment 1. The control part 11 of the in-vehicle device 1 causes the in-vehicle transmitting part 13 to successively transmit a signal for received signal strength measurement used for the vehicle cabin inside-or-outside determination from each of the plurality of transmitting antennas (3) (step S111).

The control part 21 of the portable device 2 receives through the receiving part 23 the signal transmitted from each transmitting antenna (3) and then acquires the received signal strength of each signal measured by the signal strength measurement part 23b. Then, the control part 21 transmits a response signal containing the measured received signal strength, through the transmitting part 22 to the in-vehicle device 1.

The control part 11 of the in-vehicle device 1 receives through the in-vehicle receiving part 12 the response signal transmitted from the portable device 2 (step S112). Then, the control part 11 selects space information required for determination of whether the portable device 2 is within the vehicle cabin (step S113). Specifically, the control part 11 selects any one of the small space information and the large space information stored in the storage part 14. Then, on the basis of the received signal strengths contained in the response signals received by the in-vehicle receiving part 12, the control part 11 at step S114 to step S119 executes the processing of determining whether the portable device 2 is located within each of the first to the fourth area 61a, 61b, 62a, 62b, 63a, 63b, 64a, and 64b (referred to as the first to the fourth area 61a, 61b, . . . , 64b, hereinafter). The processing of step S114 to step S119 is executed for each of the first to the fourth area 61a, 61b, . . . , 64b. However, the processing performed on the first area 61a or 61b is mainly described as a typical example.

The control part 11 reads from the storage part 14 the statistical values, that is, the first statistical values and the second statistical values, of one area among the first to the fourth area 61a, 61b, . . . , 64b concerning the small space information or the large space information having been selected (step S114). For example, in a case that the small space information is selected at step S113, the control part 11 reads from the storage part 14 the first statistical values and the second statistical values of the first area 61a concerning the small space information.

Then, on the basis of the received signal strengths contained in the response signals received at step S112 and on the basis of the first statistical values read at step S114, the control part 11 calculates a statistical distance between the received signal strengths and the sample group concerning the first statistical values (step S115). In a case that the first statistical values of the first area 61a have been read at step S114, the control part 11 calculates a statistical distance between the received signal strengths contained in the response signals and the sample group characterizing the inner side of the first area 61a. For example, the statistical distance is the Mahalanobis distance. The Mahalanobis distance is expressed by the following formula (5).

$$D^2 = (\vec{\chi} - \vec{\mu})^T \cdot \Sigma^{-1} \cdot (\vec{\chi} - \vec{\mu}) \qquad (5)$$

where
D: Mahalanobis distance
$\vec{\chi}$: received signal strength vector
$\vec{\mu}$: mean vector
$\Sigma^{-1}$: inverse variance-covariance matrix $$\vec{x} = \begin{bmatrix} \chi_1 \\ \chi_2 \\ \vdots \\ \chi_N \end{bmatrix} \quad (6)$$

where $\chi_n$: received signal strength of signal transmitted from n-th transmitting antenna Then, on the basis of the received signal strengths contained in the response signals received at step S112 and on the basis of the second statistical values read at step S114, the control part 11 calculates a statistical distance between the received signal strengths and the sample group concerning the second statistical values (step S116). In a case that the second statistical values of the first area 61a have been read at step S114, the control part 11 calculates a statistical distance between the received signal strengths contained in the response signals and the sample group characterizing the outer side of the first area 61a. For example, the statistical distance is the Mahalanobis distance.

Then, the control part 11 compares the statistical distance calculated at step S115 with the statistical distance calculated at step S116 so as to determine whether the portable device 2 is located within the one area (step S117). For example, if the statistical distance from the sample group characterizing the inner side of the first area 61a is shorter than the statistical distance from the sample group characterizing the outer side of the first area 61a, the control part 11 determines that the portable device 2 is located within the first area 61a. For example, if the statistical distance from the sample group characterizing the outer side of the first area 61a is shorter than the statistical distance from the sample group characterizing the inner side of the first area 61a, the control part 11 determines that the portable device 2 is located on the outer side of the first area 61a.

If it is determined that the portable device 2 is located on the outer side of the one area (step S117: NO), the control part 11 determines that the portable device 2 is located in the outside of the vehicle cabin (step S118), and then terminates the processing of the subroutine.

If it is determined that the portable device 2 is located within the one area (step S117: YES), the control part 11 determines whether the inside-or-outside determination of the portable device 2 has been completed for all areas (step S119). That is, it is determined whether the inside-or-outside determination of the portable device 2 in the first to the fourth area 61a, 62a, 63a, and 64a concerning the small space 60a or in the first to the fourth area 61b, 62b, 63b, and 64b concerning the large space 60b has been completed for all areas. If it is determined that the inside-or-outside determination of the portable device 2 is not yet completed for any area (step S119: NO), the control part 11 returns the processing to step S114 so as to execute the inside-or-outside determination processing for the portable device 2 for other areas on which the inside-or-outside determination is not yet performed.

If it is determined that the inside-or-outside determination of the portable device 2 has been completed for all areas (step S119: YES), the control part 11 determines that the portable device 2 is within the vehicle cabin (step S120), and then terminates the processing of the subroutine.

Figure 18:
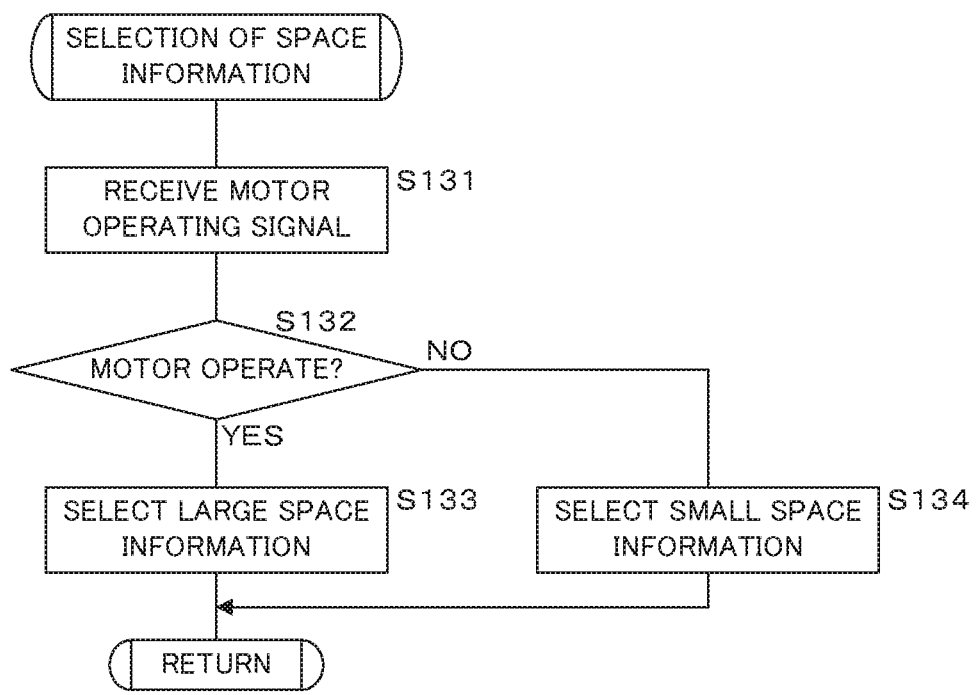
FIG. 18 is a flow chart illustrating a processing procedure of a first control part concerning selection of space information.

FIG. 18 is a flow chart illustrating a processing procedure of the control part 11 concerning the selection of the space information. The control part 11 receives a motor operating signal outputted from the body ECU 5 or the like (step S131). Then, on the basis of the received motor operating signal, the control part 11 determines whether the motor of the vehicle C is operating (step S132). If it is determined that the motor is operating (step S132: YES), the control part 11 selects the large space information (step S133) and then terminates the processing concerning the selection of the space information. If it is determined that the motor is not operating (step S132: NO), the control part 11 selects the small space information (step S134) and then terminates the processing concerning the selection of the space information.

Figure 19:
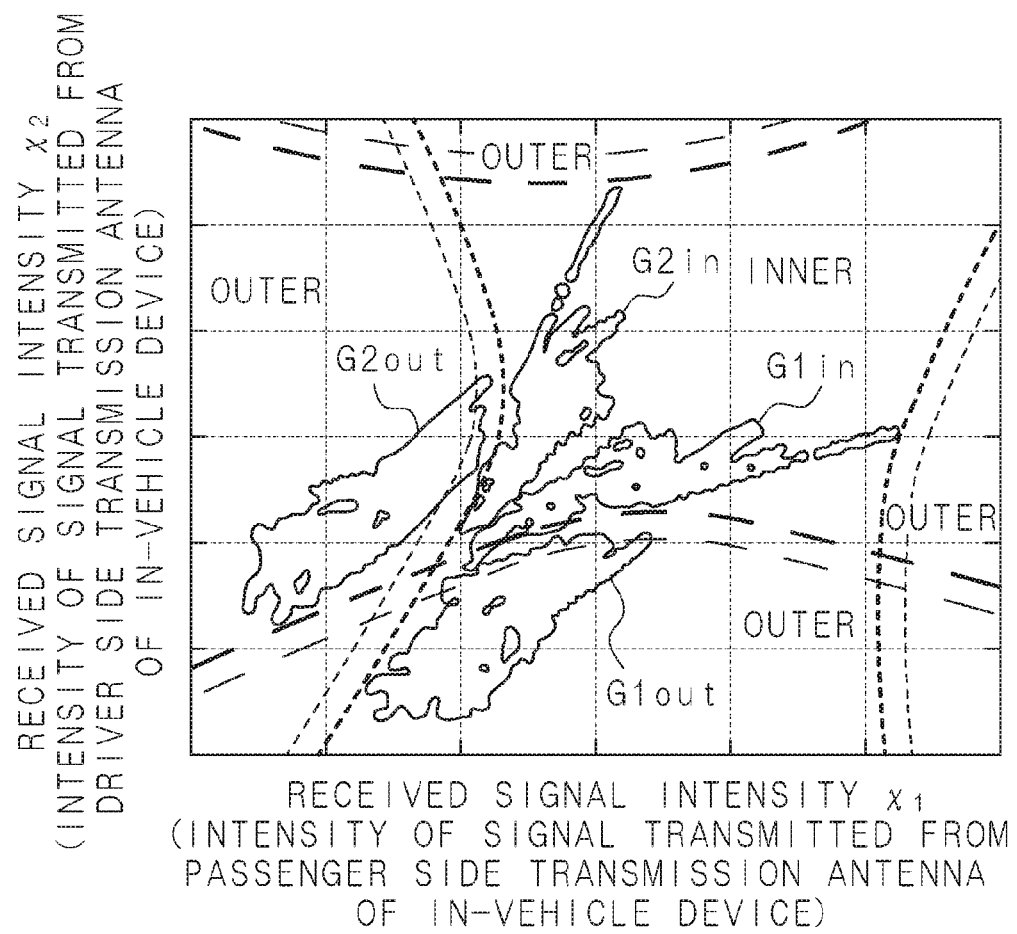
FIG. 19 is a graph illustrating a distribution of received signal strengths.

FIG. 19 is a graph illustrating the distribution of the received signal strengths. The horizontal axis indicates the received signal strength of the signal transmitted from the first transmitting antenna 31. The vertical axis indicates the received signal strength of the signal transmitted from the second transmitting antenna 32. For simplicity of description, FIG. 19 illustrates the distribution of the received signal strengths in two dimensions. In particular, FIG. 19 is a graph plotting the received signal strengths obtained by a method that the portable device 2 is arranged at a plurality of locations in the vehicle cabin inside and the vehicle cabin outside and then each signal transmitted from the first transmitting antenna 31 and the second transmitting antenna 32 is received and measured by the portable device 2. The lower part of the graph corresponds to the outside of the vehicle cabin on the driver side. The left part corresponds to the outside of the vehicle cabin on the passenger side. The center part and the upper right part correspond to the inside of the vehicle cabin.

Here, for simplicity of description by using the two-dimensional graph, the following description is given for a case that each sample acquired on the inner side and the outer side of the first area 61a or 61b and the second area 62a or 62b contains two received signal strengths, that is, the received signal strength from the first transmitting antenna 31 on the driver side and the received signal strength from the second transmitting antenna 32 on the passenger side. However, needless to say, the mode of the present invention is not limited to the processing employing such two received signal strengths.

The G1out indicates a region of the received signal strengths allowed to be measured by the portable device 2 arranged in the outside of the vehicle cabin on the driver side. The G1in indicates a region of the received signal strengths allowed to be measured by the portable device 2 arranged in the inside of the vehicle cabin on the driver side.

The G2out indicates a region of the received signal strengths allowed to be measured by the portable device 2 arranged in the outside of the vehicle cabin on the passenger side. The G2in indicates a region of the received signal strengths allowed to be measured by the portable device 2 arranged in the inside of the vehicle cabin on the passenger side.

[Description of Driver Side Area]

Each dashed thick line convex upward or downward indicates a set of received signal strengths where the statistical distance from the sample group of the inner side of the first area 61a concerning the small space 60a and the statistical distance from the sample group of the outer side become equal to each other. Thus, whether the portable device 2 is located on the inner side or the outer side of the first area 61a concerning the small space 60a is distinguished by using this set.

Similarly, each dashed thin line convex upward or downward indicates a set of received signal strengths where the statistical distance from the sample group of the inner side of the first area 61*b* concerning the large space 60*b* and the statistical distance from the sample group of the outer side become equal to each other. Thus, whether the portable device 2 is located on the inner side or the outer side of the first area 61*b* concerning the large space 60*b* is distinguished by using this set.

As recognized from the dashed lines concerning the small space 60*a* illustrated in FIG. 19, the region G1out of the received signal strengths measured in the outside of the vehicle cabin on the driver side is determined as being entirely located on the outer side (the lower side in FIG. 19) of the first area 61*a*. However, the inner side (the center side in FIG. 19) includes the G2in measured in the inside of the vehicle cabin on the passenger side and the G2out measured in the outside of the vehicle cabin on the passenger side. That is, the first area 61*a* contains the common small space 60*a* and distinguishes the inside and the outside from each other as illustrated in FIGS. 6A and 6B and FIGS. 12A and 12B.

Similarly, as recognized from the dashed lines concerning the large space 60*b*, the region G1in of the received signal strengths measured in the inside of the vehicle cabin on the driver side is determined as being entirely located on the inner side (the center side in FIG. 19) of the first area 61*b*.

[Description of Passenger Side Area]

Each dotted thick line convex rightward or leftward indicates a set of received signal strengths where the statistical distance from the sample group of the inner side of the second area 62*a* concerning the small space 60*a* and the statistical distance from the sample group of the outer side become equal to each other. Thus, whether the portable device 2 is located on the inner side or the outer side of the second area 62*a* concerning the small space 60*a* is distinguished by using this set.

Similarly, each dotted thin line convex rightward or leftward indicates a set of received signal strengths where the statistical distance from the sample group of the inner side of the second area 62*b* concerning the large space 60*b* and the statistical distance from the sample group of the outer side become equal to each other. Thus, whether the portable device 2 is located on the inner side or the outer side of the second area 62*b* concerning the large space 60*b* is distinguished by using this set.

As recognized from the dotted lines concerning the small space 60*a* illustrated in FIG. 19, the region G2out of the received signal strengths measured in the outside of the vehicle cabin on the passenger side is determined as being entirely located on the outer side (the left side in FIG. 19) of the second area 62*a*. However, the inner side (the center side in FIG. 19) includes the G1in measured in the inside of the vehicle cabin on the driver side and the G1out measured in the outside of the vehicle cabin on the driver side. That is, the second area 62*a* contains the common vehicle cabin inner space and distinguishes the inside and the outside from each other as illustrated in FIGS. 8A and 8B and FIGS. 14A and 14B.

Similarly, as recognized from the dotted lines concerning the large space 60*b*, the region G2in of the received signal strengths measured in the inside of the vehicle cabin on the passenger side is determined as being entirely located within the second area 62*a*.

[First Area and Second Area]

In order that it may be determined at step 119 and step S120 that the portable device 2 is located within the common small space 60*a* or the common large space 60*b*, it is required to be determined as being located on the inner side in the inside-or-outside determination in the first area 61*a* or 61*b* and the inside-or-outside determination in the second area 62*a* or 62*b*. Thus, by virtue of step S119 and step S120, the vehicle cabin inside-or-outside determination of whether the portable device 2 is located on the inner side or the outer side of the small space 60*a* or the large space 60*b* is allowed to be accurately achieved on the right side face and the left side face.

[Third Area and Fourth Area]

As described above, the vehicle cabin inside-or-outside determination of the portable device 21 is allowed to be accurately performed on the boundaries of the right side face and the left side face of the small space 60*a* or the large space 60*b*. However, when required, the inside-or-outside determination on any other boundary may be added in accordance with a similar technique. For example, a configuration may be employed that the third area 63*a* or 63*b* and the fourth area 64*a* or 64*b* that follow the rear face and the front face of the small space 60*a* or the large space 60*b* are added and then the inside-or-outside determination of the portable device 2 is performed on the first to the fourth area 61*a*, 61*b*, . . . , 64*b*. In this case, the vehicle cabin inside-or-outside determination of whether the portable device 2 is located on the inner side or the outer side of the small space 60*a* or the large space 60*b* is allowed to be accurately achieved on the right side face, the left side face, the rear face, and the front face of the small space 60*a* or the large space 60*b*.

According to the vehicle-use communication system, the in-vehicle device 1, the portable device 2, and the computer program 10*a* of the present Embodiment 1 having the above-described configuration, regardless of the influence of a signal partly leaking from the inside of the vehicle cabin through the glass portion of the vehicle door to the outside of the vehicle cabin, a situation is avoided that the portable device 2 actually located in the outside of the vehicle cabin is erroneously determined as being within the vehicle cabin. Further, the portable device 2 within the vehicle cabin is allowed to be reliably detected.

Specifically, in accordance with the operating state of the motor, the in-vehicle device 1 selects the small space information or the large space information and then is allowed to determine whether the portable device 2 is within the vehicle cabin. That is, in a case that a situation is expected that the motor is operating and hence the user stays in the inside of the vehicle cabin, the in-vehicle device 1 selects the large space information so as to be allowed to reliably detect the portable device 2 within the vehicle cabin.

Further, in a case that the motor is stopping, a situation is expected that the user does not stay in the inside of the vehicle cabin. Thus, the in-vehicle device 1 selects the small space information so that a situation is reliably avoided that the portable device 2 actually located in the outside of the vehicle cabin is erroneously determined as being within the vehicle cabin.

Further, when the inside-or-outside determination of the portable device 2 is performed for each of the first to the fourth area 61*a*, 62*a*, 63*a*, and 64*a* concerning the small space 60*a* so that whether the portable device 2 is located within every area is determined, whether the portable device 2 is located within the small space 60*a* is allowed to be accurately determined.

Similarly, when the inside-or-outside determination of the portable device 2 is performed for each of the first to the fourth area 61*b*, 62*b*, 63*b*, and 64*b* concerning the large space 60*b* so that whether the portable device 2 is located within every area is determined, whether the portable device 2 is located within the large space 60*b* is allowed to be accurately determined.

Further, the in-vehicle device 1 performs the vehicle cabin inside-or-outside determination of the portable device 2 by using the first statistical values and the second statistical values individually characterizing the inner side and the outer side of the first area 61*a* or 61*b* and the second area 62*a* or 62*b*. As illustrated in FIGS. 7A and 7B, FIGS. 9A and 9B, and the like, the first statistical values and the second statistical values are calculated on the basis of the sample groups of the received signal strengths measured at a plurality of locations along the vehicle cabin inner side and the vehicle cabin outer side of the right inner surface and the left inner surface of the vehicle C. When the sample groups described above are utilized as the sample groups for calculating the first statistical values and the second statistical values, the number of processes required for generation of the statistical values used for the inside-or-outside determination of the portable device 2 in the first area 61*a* or 61*b* and the second area 62*a* or 62*b* is effectively suppressed in comparison with a case that a huge sample group generated at random is employed.

Further, the in-vehicle device 1 may calculate the statistical distance from each of the sample groups characterizing the inner side and the outer side of the first to the fourth area 61*a*, 61*b*, . . . , 64*b*, on the basis of the first statistical values and the second statistical values and then may compare the calculated statistical distances with each other so as to perform the vehicle cabin inside-or-outside determination of the in-vehicle device 1. Specifically, the vehicle cabin inside-or-outside determination of the portable device 2 is allowed to be accurately performed by employing simple arithmetic operation such as the calculation of the Mahalanobis distance and the comparison of the Mahalanobis distances.

Here, the present Embodiment 1 has been described for an example that the received signal strengths of the sample groups used for calculating the first statistical values and the second statistical values individually characterizing the inner side and the outer side of the first area 61*a* or 61*b* and the second area 62*a* or 62*b* are measures at the locations illustrated in FIGS. 7A and 7B, FIGS. 9A and 9B, and the like. However, these measurement locations are exemplary. For example, as for the sample group used for calculating the first statistical values concerning the first area 61*a* or 61*b*, it is sufficient that the received signal strengths are measured at least at a plurality of locations along the vehicle cabin inner side of the right side face of the vehicle cabin R and at a plurality of locations along the vehicle cabin outer side so that the first area 61*a* or 61*b* contains the common small space 60*a* or the common large space 60*b*. Further, a similar situation holds also for the second area 62*a* or 62*b*, the third area 63*a* or 63*b*, and the fourth area 64*a* or 64*b*.

Even in a case that the first statistical values and the second statistical values obtained by the method described above are employed, similar effects to those of the vehicle-use communication system described above are obtained.

Further, the present Embodiment 1 has been described mainly for an example of the vehicle cabin inside-or-outside determination of the portable device 2 in a case that a driver seat request switch 51 is operated. However, the present disclosure is applicable to various processing that requires the vehicle cabin inside-or-outside determination of the portable device 2. For example, the present disclosure is applicable to various processing such as checking of whether the portable device 2 is within the vehicle cabin at the time of engine start, checking of whether the portable device 2 is within the vehicle cabin during the engine operation, and checking of the position of the portable device 2 for avoiding a situation that the portable device 2 is locked in the vehicle cabin.

Further, the description given above has been for an example that the inside-or-outside determination in the first to the fourth area 61*a*, 61*b*, . . . , 64*b* is performed by employing the Mahalanobis distance. However, the Mahalanobis distance is merely an example of the statistical distance. That is, any other arbitrary statistical values such as the statistical distance and the similarity may be employed as long as the degree of approximation between the measured received signal strengths and a particular sample group is allowed to be determined.

Further, the description given above has been for an example that the vehicle cabin inside-or-outside determination is achieved by the inside-or-outside determination in the first to the fourth area 61*a*, 61*b*, . . . , 64*b*. However, the first to the fourth area 61*a*, 61*b*, . . . , 64*b* are exemplary. That is, as long as a configuration is employed that the inside-or-outside determination is performed by using areas each having a boundary that follows a part of the inner face of the small space 60*a* or the large space 60*b*, arbitrary modification may be made to the vehicle-use communication system. For example, the vehicle cabin inside-or-outside determination of the portable device 2 may be performed by employing any two or three of the first to the fourth area 61*a*, 61*b*, . . . , 64*b*. Further, the vehicle cabin inside-or-outside determination of the portable device 2 may be performed by employing other two or more areas each having a shape different from those of the present Embodiment 1.

Furthermore, the vehicle-use communication system of the present Embodiment 1 has been described for an example that the storage part 14 stores the mean vector and the inverse variance-covariance matrix as the statistical values characterizing the inner side and the outer side of the first to the fourth area 61*a*, 61*b*, . . . , 64*b*. However, as long as the information allows the inside-or-outside determination in each area, employable contents and storing methods thereof are not limited to particular ones. For example, the storage part 14 may store the mean vector and the variance-covariance matrix or, alternatively, may store the sample group itself. Further, the information such as the statistical values may be in a form different from that of the computer program 10*a* or, alternatively, may be information contained in the computer program 10*a*.

Furthermore, the locations of sampling the sample groups illustrated in FIGS. 7A and 7B, FIGS. 9A and 9B, and the like are exemplary. That is, the statistical values of each area may be calculated by using a sample group of the received signal strengths measured at any other location as long as an area is allowed to be set forth such as to have a boundary that follows a part of the inner face of the small space 60*a* or the large space 60*b* and contain the entirety of the small space 60*a* or the large space 60*b*.

(Embodiment 2)

In a vehicle-use communication system, a the in-vehicle device 1, a portable device 2, and a computer program 10*a* according to the present Embodiment 2, the selection processing of the small space 60*a* or the large space 60*b* is different from that in Embodiment 1. Thus, the following description is given with focusing attention mainly on this difference. The other configurations and operation effects are similar to those of Embodiment 1. Thus, corresponding parts are designated by like numerals and then detailed description is not given.

Figure 20:
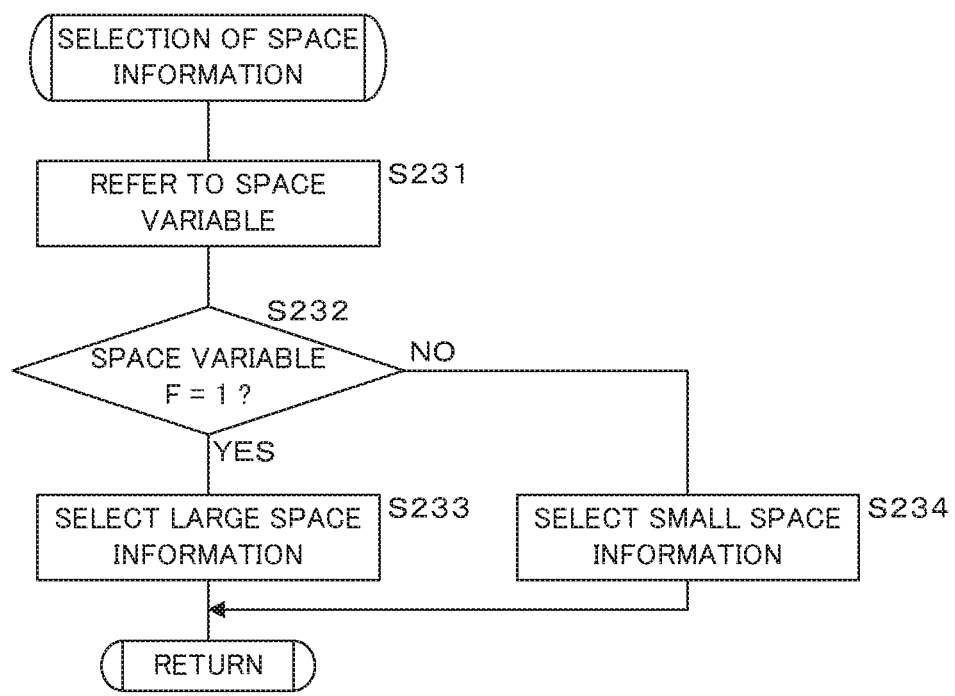
FIG. 20 is a flow chart illustrating a processing procedure of a control part concerning selection of space information in Embodiment 2.

FIG. 20 is a flow chart illustrating a processing procedure of the control part 11 concerning the selection of the space information in Embodiment 2. The control part 11 of the in-vehicle device 1 refers to a space variable F (step S231) and then determines whether the space variable F is equal to 1 (step S232). The space variable F is a variable switched depending on the operating state of the motor, the lock state and the open-or-closed state of the vehicle door. Then, the space variable F is set to be 1 in a case that the possibility that the user stays in the inside of the vehicle cabin is high, and is set to be 0 in a case that the possibility that the user does not stay in the inside of the vehicle cabin is high. If it is determined that the value of the space variable F is equal to 1 (step S232: YES), the control part 11 selects the large space information (step S233) and then terminates the processing concerning the selection of the space information. If it is determined that the value of the space variable F is equal to 0 (step S232: NO), the control part 11 selects the small space information (step S234) and then terminates the processing concerning the selection of the space information.

Figure 21:
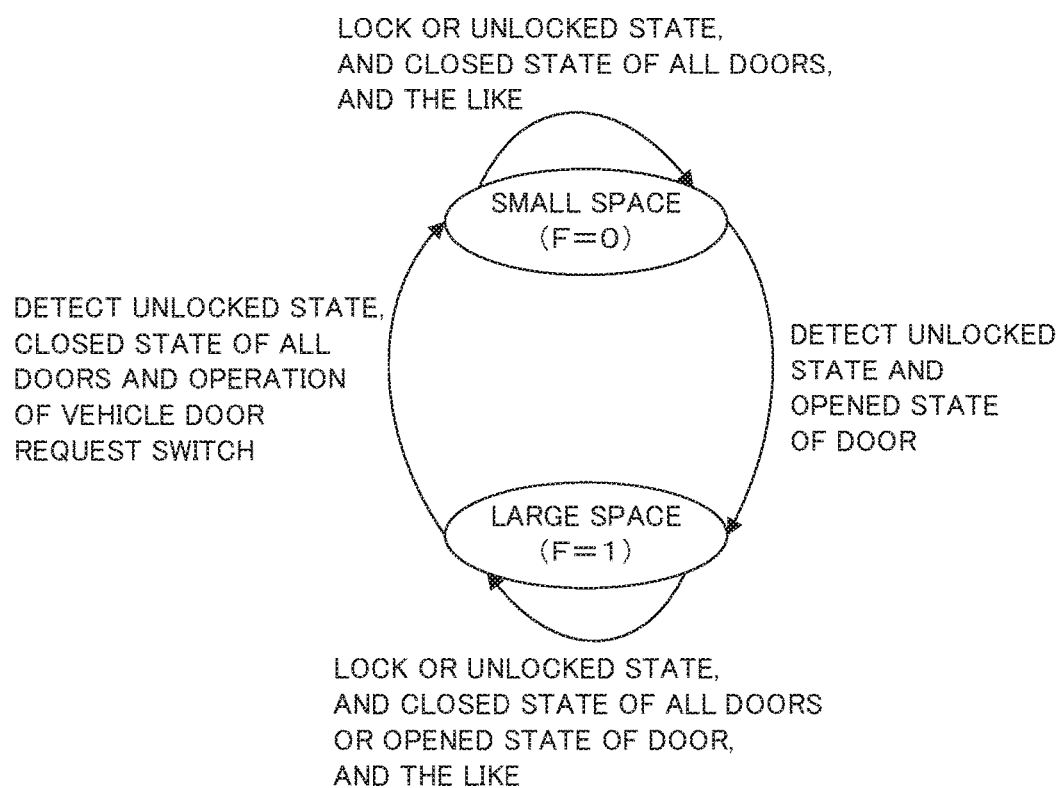
FIG. 21 is a state transition diagram concerning switching of a space variable.

FIG. 21 is a state transition diagram concerning the switching of the space variable F. On the basis of the door lock state signal, the door open-or-closed state signal, and the request signal corresponding to the operating state of the vehicle door request switch 5a, the control part 11 of the in-vehicle device 1 monitors the lock state and the open-or-closed state of the vehicle door, the operating state of the vehicle door request switch 5a, and the like so as to switch the space variable F corresponding to the small space 60a or the large space 60b as illustrated in the state transition diagram of FIG. 21. When the vehicle door is locked, the space variable F is in a state that the small space information is selected (corresponding to the space variable F=0). When the vehicle door is unlocked and then a given event such as detection of an opened state of the vehicle door occurs, transition occurs into the state that the large space information is selected (corresponding to the space variable F=1). The upper ellipse in FIG. 21 indicates the state that the small space information is selected and the lower ellipse indicates the state that the large space information is selected. Each arrow indicates an event causing the state transition. In the flowing description, the state that the small space information is selected (corresponding to the space variable F=0) is referred to as a small space state and the state that the large space information is selected (corresponding to the space variable F=1) is referred to as a large space state. The small space state is a state in which a situation is allowed to be reliably avoided that the portable device 2 actually located in the outside of the vehicle cabin is erroneously determined as being within the vehicle cabin. Further, the large space state is a state in which the portable device 2 within the vehicle cabin is allowed to be reliably detected.

In the small space state, when the vehicle door is unlocked and then an opened state of the vehicle door is detected, transition occurs from the small space state to the large space state. In the small space state, even when locking or unlocking of the vehicle door is merely detected, state transition does not occur. That is, in the small space state, unless the vehicle door is unlocked and then an opened state of the vehicle door is detected, transition from the small space state to the large space state does not occur and hence the small space state is maintained.

In the large space state, in a state that the vehicle door is unlocked, when all vehicle doors are in a closed state and operation of the vehicle door request switch 5a has been detected, transition occurs from the large space state to the small space state. In the large space state, even when unlocking of the vehicle door and opening or closing of the vehicle door are merely detected, state transition does not occur. That is, in the large space state, in a state that the vehicle door is unlocked, unless all vehicle doors are in a closed state and operation of the vehicle door request switch 5a has been detected, transition does not occur from the large space state to the small space state and hence the large space state is maintained.

According to Embodiment 2, in accordance with the lock state and the open-or-closed state of the vehicle door and the state of the vehicle door request switch 5a, the in-vehicle device 1 selects the small space information or the large space information and then determines whether the portable device 2 is within the vehicle cabin.

Thus, the small space information or the large space information is selected in accordance with the states of the vehicle, that is, in accordance with the lock state and the open-or-closed state of the door of the vehicle and the operating state of the vehicle door request switch 5a, so that the detection characteristics for the position of the portable device 2 is allowed to be suitably switched.

In a case that the user carrying the portable device 2 stays in the inside of the vehicle cabin and hence priority is to be imparted to reliable detection of the portable device 2 within the vehicle cabin, it is sufficient that the control part 11 selects the large space information. In contrast, in a case that the user stays in the outside of the vehicle cabin and the door of the vehicle is locked, it is sufficient that the small space information is selected in order that a situation may reliably be avoided that the portable device 2 actually located in the outside of the vehicle cabin is erroneously determined as being within the vehicle cabin.

Here, employable states of the vehicle are not limited to the lock state and the open-or-closed state of the vehicle door and the operating state of the vehicle door request switch 5a as described above, and may include the operating state of the motor and the running state of the vehicle. For example, the vehicle C may be provided with a vehicle speed sensor detecting the speed of the vehicle and a vehicle speed signal outputted from the vehicle speed sensor may be inputted to the control part 11. The vehicle speed signal is a signal corresponding to the vehicle speed. On the basis of the vehicle speed signal, the control part 11 may determine whether the vehicle is running. Then, if it is determined as running, the large space information may be selected. In this case, there is no possibility that a third person trespasses from the outside of the vehicle cabin into the vehicle cabin R. Thus, the large space information is selected so that the portable device 2 within the vehicle cabin is allowed to be reliably detected.

Specifically, in order that a situation may be reliably avoided that the portable device 2 actually located in the outside of the vehicle cabin is erroneously determined as being within the vehicle cabin, the control part 11 basically selects the small space information, that is, stays in the small space state illustrated in FIG. 21. In a case that unlocking of the vehicle door and an opened state of the vehicle door have been sequentially detected, a situation is highly expected that the user goes in and out the vehicle cabin R and that the portable device 2 within the vehicle cabin is required to be detected. Thus, the control part 11 selects the large space information. That is, transition occurs to the large space state illustrated in FIG. 21. When the large space information is selected, the portable device 2 within the vehicle cabin is allowed to be reliably detected and then the processing of starting of the motor or the like is allowed to be reliably executed.

In a state that the small space information is selected, unless the vehicle door is unlocked and then an opened state of the vehicle door is detected, transition from the small space state to the large space state does not occur and hence the small space state is maintained. When the small space state is maintained, a situation is reliably avoided that the portable device 2 actually located in the outside of the vehicle cabin is erroneously determined as being within the vehicle cabin.

Further, in a case that the vehicle door request switch 5*a* is operated in a situation that the door of the vehicle is unlocked, there is a high possibility that the vehicle door has been locked in a situation that the user stays in the outside of the vehicle cabin. Thus, the control part 11 selects the small space information. That is, transition occurs to the small space state illustrated in FIG. 21. Since the small space information is used in the vehicle cabin inside-or-outside determination at the time of locking processing, a situation is reliably avoided that the portable device 2 actually located in the outside of the vehicle cabin is erroneously determined as being within the vehicle cabin.

In a state that the large space information is selected, unless the vehicle door request switch 5*a* is operated in a situation that the vehicle door is unlocked, transition does not occur from the large space state to the small space state and hence the state that the large space information is selected is maintained. When the large space state is maintained, the portable device 2 within the vehicle cabin is allowed to be reliably detected and then the processing of starting of the motor or the like is allowed to be reliably executed.

(Embodiment 3)

In a vehicle-use communication system, a the in-vehicle device 1, a portable device 2, and a computer program 10*a* according to the present Embodiment 3, the selection processing of the small space 60*a* or the large space 60*b* is different from that in Embodiment 1. Thus, the following description is given with focusing attention mainly on this difference. The other configurations and operation effects are similar to those of Embodiment 1. Thus, corresponding parts are designated by like numerals and then detailed description is not given.

Figure 22:
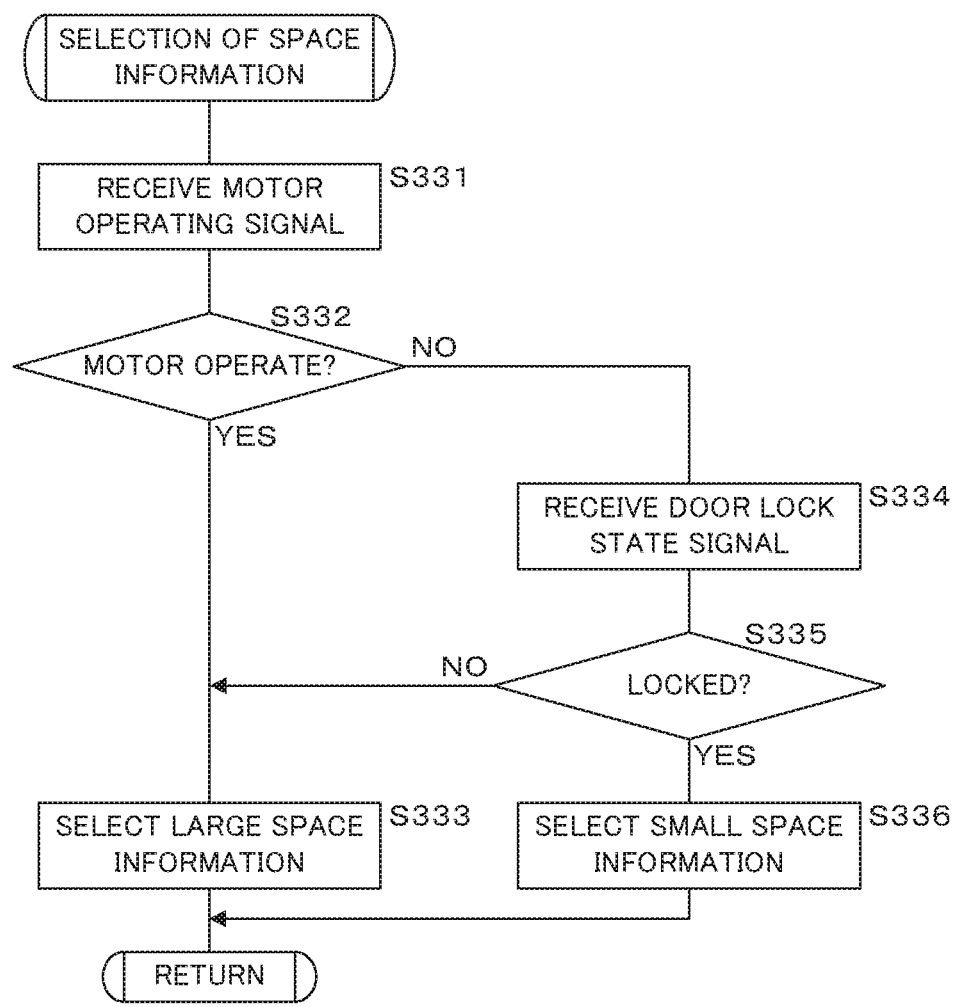
FIG. 22 is a flow chart illustrating a processing procedure of a control part concerning selection of space information in Embodiment 3.

FIG. 22 is a flow chart illustrating a processing procedure of the control part 11 concerning the selection of the space information in Embodiment 3. The control part 11 receives a motor operating signal outputted from the body ECU 5 or the like (step S331). Then, on the basis of the received motor operating signal, the control part 11 determines whether the motor of the vehicle C is operating (step S332). If it is determined that the motor is operating (step S332: YES), the control part 11 selects the large space information (step S333) and then terminates the processing concerning the selection of the space information. If it is determined that the motor is not operating (step S332: NO), the control part 11 receives the door lock state signal (step S334) so as to determine whether the vehicle door is locked (step S335). If it is determined that the vehicle door is not locked (step S335: NO), the control part 11 selects the large space information (step S333) and then terminates the processing concerning the selection of the space information. If it is determined that the vehicle door is locked (step S335: YES), the control part 11 selects the small space information (step S336) and then terminates the processing concerning the selection of the space information.

According to Embodiment 3, in a case that the motor is operating, similarly to Embodiment 1, the in-vehicle device 1 selects the large space information. In a case that the motor is not operating and the vehicle door is locked, there is a high possibility that the user does not stay in the inside of the vehicle cabin. Thus, the in-vehicle device 1 selects the small space information so that a situation is reliably avoided that the portable device 2 actually located in the outside of the vehicle cabin is erroneously determined as being within the vehicle cabin.

In a case that the motor is not operating and the vehicle door is not locked, a situation may be expected that the user goes in and out the vehicle cabin R and that the portable device 2 within the vehicle cabin is required to be detected. Thus, the in-vehicle device 1 selects the large space information so that the portable device 2 within the vehicle cabin is allowed to be detected without an error.

(Embodiment 4)

In a vehicle-use communication system, a the in-vehicle device 1, a portable device 2, and a computer program 10*a* according to the present Embodiment 4, the selection processing of the small space 60*a* or the large space 60*b* is different from that in Embodiment 1. Thus, the following description is given with focusing attention mainly on this difference. The other configurations and operation effects are similar to those of Embodiment 1. Thus, corresponding parts are designated by like numerals and then detailed description is not given.

Figure 23:
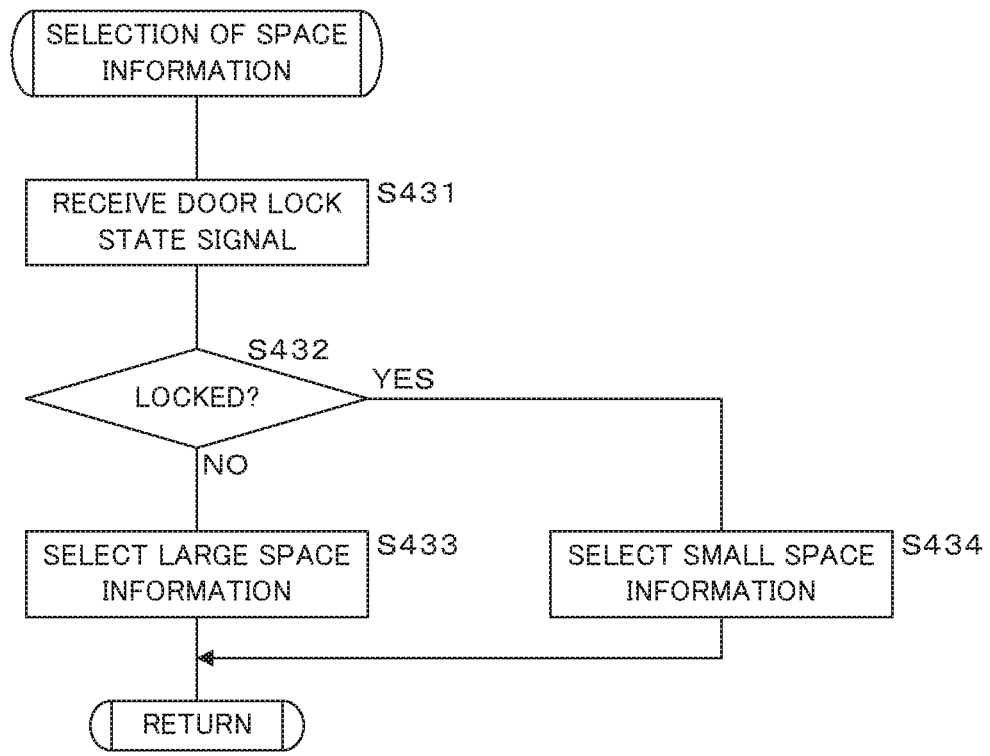
FIG. 23 is a flow chart illustrating a processing procedure of a control part concerning selection of space information in Embodiment 4.

FIG. 23 is a flow chart illustrating a processing procedure of the control part 11 concerning the selection of the space information in Embodiment 4. The control part 11 of the in-vehicle device 1 receives a door lock state signal outputted from the body ECU 5 or the like (step S431). Then, on the basis of the received door lock state signal, the control part 11 determines whether the vehicle door is locked (step S432). If it is determined that the vehicle door is not locked (step S432: NO), the control part 11 selects the large space information (step S433) and then terminates the processing concerning the selection of the space information. If it is determined that the vehicle door is locked (step S432: YES), the control part 11 selects the small space information (step S434) and then terminates the processing concerning the selection of the space information.

According to Embodiment 4, when locking of the vehicle door is detected, the in-vehicle device 1 selects the small space information and then determines whether the portable device 2 is within the vehicle cabin. When the in-vehicle device 1 selects the small space information, a situation is reliably avoided that the portable device 2 actually located in the outside of the vehicle cabin is erroneously determined as being within the vehicle cabin.

Further, when unlocking of the door of the vehicle C is detected, a situation may be expected that the user goes in and out the vehicle cabin R and that the portable device within the vehicle cabin is required to be detected. Thus, the in-vehicle device 1 selects the large space information and then determines whether the portable device 2 is within the vehicle cabin. When the large space information is selected, the in-vehicle device 1 is allowed to detect the portable device 2 within the vehicle cabin without an error. For example, in a smart start system, when the user having entered the inside of the vehicle cabin is to start the motor, the in-vehicle device 1 is allowed to reliably detect the portable device 2 carried by the user and then start the motor.

(Embodiment 5)

In a vehicle-use communication system, a the in-vehicle device 1, a portable device 2, and a computer program 10*a* according to the present Embodiment 5, the inside-or-outside determination in the small space 60a and the large space 60b is performed by using a discriminant in place of the statistical values. In the vehicle-use communication system and the computer program 10a according to Embodiment 5, the contents of the small space information and the large space information stored in the storage part 14 of the in-vehicle device 1 and the processing procedure of the control part 11 are different from those of Embodiments 1 to 4. Thus, the following description is given mainly for these differences. The other configurations and operation effects are similar to those of Embodiment 1. Thus, corresponding parts are designated by like numerals and then detailed description is not given.

The storage part 14 of the in-vehicle device 1 stores a discriminant for discriminating whether the portable device 2 is located on the inner side or the outer side of the first area 61a concerning the small space 60a on the basis of the received signal strengths of the signals transmitted from the plurality of transmitting antennas (3). Similarly to Embodiment 1, the received signal strengths are measured by the signal strength measurement part 23b of the portable device 2. The first area 61a is one area on which the inside-or-outside determination of the portable device 2 is to be performed by the control part 11, and contains the small space 60a on which determination of whether the portable device 2 is located on the inner side or the outer side is to be performed.

In other words, the storage part 14 stores a discriminant for distinguishing the received signal strengths measured in the outside of the vehicle cabin on the driver side from the received signal strengths measured in the other locations. For example, the discriminant is an approximation formula of a curve that joins together the received signal strengths where the Mahalanobis distance from the sample group characterizing the inner side of the first area 61a and the Mahalanobis distance from the sample group characterizing the outer side of the first area 61a become equal to each other. The discriminant used for the inside-or-outside determination of the portable device 2 in the first area 61a is expressed by the following formula (7).

$$Y = A_n \chi_1^n + A_{n-1} \chi_1^{n-1} + \ldots + A_1 \chi_1 + B \quad (7)$$

where
$A_n, A_{n-1}, \ldots A_1, B$: constants setting forth the function of individual components of received signal strength vector where Mahalanobis distance from sample group of inner side of first domain becomes equal to Mahalanobis distance from sample group of outer side of first domain Similarly, the storage part 14 stores a discriminant for distinguishing, on the basis of the received signal strengths, whether the portable device is located on the inner side or the outer side of the second to the fourth area 62a, 63a, and 64a concerning the small space 60a. Further, the storage part 14 stores a discriminant for distinguishing, on the basis of the received signal strengths, whether the portable device is located on the inner side or the outer side of the first to the fourth area 61b, 62b, 63b, and 64b concerning the large space 60b.

Figure 24:
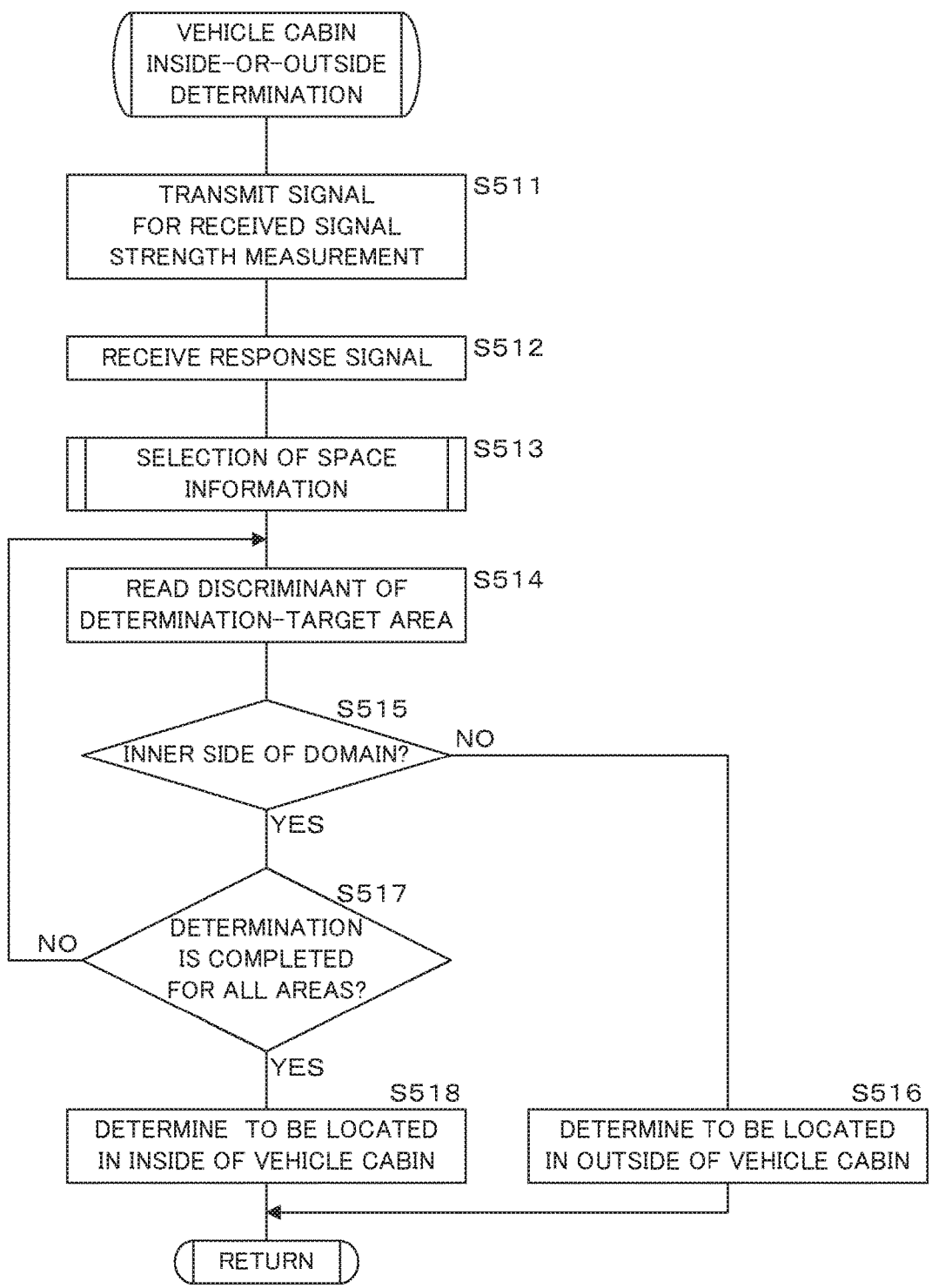
FIG. 24 is a flow chart illustrating a processing procedure of a vehicle cabin inside-or-outside determination subroutine in Embodiment 5.

FIG. 24 is a flow chart illustrating a processing procedure of the vehicle cabin inside-or-outside determination subroutine in Embodiment 5. The in-vehicle device 1 at step S511 to step S513 executes the processing (step S111 to step S113) similar to Embodiment 1 concerning the measurement of received signal strengths, the receiving of response signals, and the selection of space information.

Then, the control part 11 of the in-vehicle device 1 reads from the storage part 14 a discriminant for one area among the first to the fourth area 61a, 61b, . . . , 64b concerning the small space information or the large space information having been selected (step S514). Then, by using the received signal strengths contained in the received response signals and the discriminant read at step S514, the control part 11 performs the inside-or-outside determination of the portable device 2 in the one area (step S515). For example, in a case that the received signal strength vector is of two dimensions, a function value Y obtained such that one received signal strength contained in the response signal is substituted into $\chi_1$ of the formula (7) given above is compared with another received signal strength contained in the response signal so that the inside-or-outside determination is performed.

Then, processing similar to that of Embodiments 1 to 4 concerning the inside-or-outside determination of the portable device 2 in each area and the vehicle cabin inside-or-outside determination (step S118 to step S120) is executed at step S516 to step S518.

According to Embodiment 5, the inside-or-outside determination of the portable device 2 in the first area 61a or 61b and the second area 62a or 62b is performed by using a polynomial adjusted such that each area may contain the small space 60a or the large space 60b. Thus, whether the portable device 2 is located on the inner side or the outer side of the small space 60a or the large space 60b is allowed to be accurately determined. Further, similarly to Embodiments 1 to 4, the number of processes required for generation of the discriminant is allowed to be suppressed.

Here, the dimension and the form of each discriminant according to the present Embodiment 5 are not limited to particular ones.

(Embodiment 6)

The present Embodiments 1 to 5 have been described for an example that the in-vehicle device 1 performs the vehicle cabin inside-or-outside determination of the portable device 2. Instead, a configuration may be employed that the portable device 2 itself performs the vehicle cabin inside-or-outside determination. The configuration of the vehicle-use communication system according to Embodiment 6 is similar to the configuration of Embodiments 1 to 5 and hence the in-vehicle device 1 and the portable device 2 are provided. In the portable device 2 of Embodiment 6, the storage part 24 stores: the small space information and the large space information; and a computer program of the present disclosure.

In the vehicle-use communication system of Embodiment 6, the control part 21 of the portable device 2 executes the processing of step S111 to step S120 described in FIG. 17 or the processing of step S511 to step S518 described in FIG. 24 and then transmits the vehicle cabin inside-or-outside determination result to the in-vehicle device 1. The detailed processing procedure is as follows.

The in-vehicle device 1 successively transmits signals from the plurality of transmitting antennas (3). The control part 21 of the portable device 2 receives through the receiving part 23 the signal transmitted from each transmitting antenna (3) and then acquires the received signal strength of each signal measured by the signal strength measurement part 23b. Further, the in-vehicle device 1 transmits to the portable device 2 the information required by the portable device 2 in the selection of the small space information or the large space information. The portable device 2 receives the information transmitted from the in-vehicle device 1. For example, the information required for the selection of the small space information or the large space information is the information indicating the operating state of the motor, the information indicating the lock state of the vehicle door, the information indicating the open-or-closed state of the vehicle door, or the like. Then, on the basis of the information indicating the operating state of the motor, the information indicating the lock state of the vehicle door, the information indicating the open-or-closed state of the vehicle door, or the like having been received, the control part 21 selects the small space information or the large space information and then reads from storage part 24 the small space information or the large space information having been selected.

Then, on the basis of the measured received signal strengths and on the basis of the small space information or the large space information having been read, the control part 21 determines whether the portable device 2 is within the vehicle cabin. Then, the control part 21 of the portable device 2 transmits a response signal containing the vehicle cabin inside-or-outside determination result of the portable device 2, through the transmitting part 22 to the in-vehicle device 1.

The in-vehicle device 1 receives the response signal transmitted from the portable device 2 and then, in accordance with the vehicle cabin inside-or-outside determination result contained in the received response signal, executes given processing. For example, the in-vehicle device 1 executes the processing of locking or unlocking of the vehicle door.

According to Embodiment 6, similarly to Embodiments 1 to 5, when the inside-or-outside determination of the portable device 2 is performed in the first to the fourth area 61a, 61b, ..., 64b, whether the portable device 2 is within the vehicle cabin is allowed to be accurately determined. The other effects are similar to those of Embodiments 1 to 5.

The embodiments disclosed above are to be regarded as exemplary at all points and as not restrictive. The scope of the present invention is defined by the scope of the claims rather than the above-described meaning and is intended to include all changes within the scope of the claims and the scope or the meaning equivalent thereto.

The invention claimed is:

1. A vehicle-use communication system comprising:
an in-vehicle device transmitting a signal from a plurality of antennas provided in a vehicle; and a portable device receiving the signal transmitted from the in-vehicle device and transmitting a response signal in accordance with the received signal, wherein
the portable device includes:
a measurement circuit measuring the received signal strength of the signal transmitted from each of the plurality of antennas; and
a transmitter transmitting a response signal containing the received signal strength of each signal measured by the measurement circuit, and wherein
the in-vehicle device includes:
an in-vehicle receiver receiving the response signal transmitted from the portable device;
a storage storing small space information concerning a small space contained in a vehicle cabin and large space information concerning a large space larger than the small space and containing the vehicle cabin; and
a controller coupled to the in-vehicle receiver and the storage, wherein
the controller
selects the small space information or the large space information stored in the storage; and determines whether the portable device is within the vehicle cabin on the basis of the received signal strengths contained in the response signals received by the in-vehicle receiver and on the basis of the small space information or the large space information selected by the controller;
the small space information includes statistical values based on a sample group characterizing an inner side and an outer side of each of a plurality of areas different from each other but each having a boundary that follows a part of a face of the small space and each containing in common the small space;
the large space information includes statistical values based on a sample group characterizing an inner side and an outer side of each of a plurality of areas different from each other but each having a boundary that follows a part of a face of the large space and each containing in common the large space; and
the controller determines whether the portable device is within the vehicle cabin by determining whether the portable device is located within each of the plurality of areas each containing in common the small space or the large space and determining whether the portable device is located within every area.

2. The vehicle-use communication system according to claim 1, wherein the controller detects a state of the vehicle; and in accordance with the state detected by the controller, selects the large space information or the small space information.

3. The vehicle-use communication system according to claim 2, wherein the controller detects a lock state of a door of the vehicle, an open-or-closed state of the door of the vehicle and a state of an outside-the-vehicle switch provided in the door of the vehicle.

4. The vehicle-use communication system according to claim 3, wherein the controller selects the large space information in a case that the controller has detected an opened state of the door of the vehicle in a situation that the door of the vehicle is unlocked.

5. The vehicle-use communication system according to claim 4, wherein the controller maintains the selection of the small space information in a case that the small space information has been selected and the controller has not detected an opened state of the door of the vehicle in a situation that the door of the vehicle is unlocked.

6. The vehicle-use communication system according to claim 3, wherein the controller selects the small space information in a case that the controller has detected operation of the outside-the-vehicle switch in a situation that the door of the vehicle is unlocked.

7. The vehicle-use communication system according to claim 6, wherein the controller maintains the selection of the large space information in a case that the large space information has been selected and the controller has not detected operation of the outside-the-vehicle switch in a situation that the door of the vehicle is unlocked.

8. An in-vehicle device transmitting a signal from a plurality of antennas provided in a vehicle and receiving a response signal transmitted from a portable device in accordance with the signal, comprising:
an in-vehicle receiver receiving the response signals containing received signal strengths of the signals individually transmitted from the plurality of antennas measured at the portable device;
a storage storing small space information concerning a small space contained in a vehicle cabin and large space information concerning a large space larger than the small space and containing the vehicle cabin; and a controller coupled to the in-vehicle receiver and the storage, wherein the controller selects the small space information or the large space information stored in the storage; and determines whether the portable device is within the vehicle cabin on the basis of the received signal strengths contained in the response signals received by the in-vehicle receiver and on the basis of the small space information or the large space information selected by the controller;

the small space information includes statistical values based on a sample group characterizing an inner side and an outer side of each of a plurality of areas different from each other but each having a boundary that follows a part of a face of the small space and each containing in common the small space;

the large space information includes statistical values based on a sample group characterizing an inner side and an outer side of each of a plurality of areas different from each other but each having a boundary that follows a part of a face of the large space and each containing in common the large space; and the controller determines whether the portable device is within the vehicle cabin by determining whether the portable device is located within each of the plurality of areas each containing in common the small space or the large space and determining whether the portable device is located within every area.

* * * * *